US011035137B1

(12) United States Patent
McDonald

(10) Patent No.: US 11,035,137 B1
(45) Date of Patent: Jun. 15, 2021

(54) DUAL-USE CONCRETE COVER

(71) Applicant: McTech Group, Inc., Hertford, NC (US)

(72) Inventor: Stephen F. McDonald, Hertford, NC (US)

(73) Assignee: McTech Group, Inc., Hertford, NC (US)

(*) Notice: Subject to any disclaimer, the term of this patent is extended or adjusted under 35 U.S.C. 154(b) by 0 days.

(21) Appl. No.: 17/030,939

(22) Filed: Sep. 24, 2020

(51) Int. Cl.
*E04G 21/24* (2006.01)
*B32B 27/12* (2006.01)
*B32B 5/26* (2006.01)

(52) U.S. Cl.
CPC .......... *E04G 21/246* (2013.01); *B32B 5/26* (2013.01); *B32B 27/12* (2013.01); *B32B 2262/02* (2013.01); *B32B 2262/062* (2013.01); *B32B 2307/726* (2013.01)

(58) Field of Classification Search
CPC ......... E04G 21/246; B32B 5/26; B32B 27/12; B32B 2262/02; B32B 2262/062; B32B 2262/726
USPC ........................................................ 264/228
See application file for complete search history.

(56) References Cited

U.S. PATENT DOCUMENTS

| | | | |
|---|---|---|---|
| 4,485,137 A | 11/1984 | White | |
| 4,704,117 A | 11/1987 | Mitchell | |
| 5,026,591 A * | 6/1991 | Henn | B01D 69/10 428/198 |
| 5,028,468 A | 7/1991 | Taylor | |
| 5,780,367 A | 7/1998 | Handwerker | |
| 5,843,554 A | 12/1998 | Katz | |
| 5,888,526 A | 3/1999 | Tsubai et al. | |
| 6,531,206 B2 | 3/2003 | Johnston et al. | |

(Continued)

FOREIGN PATENT DOCUMENTS

| | | |
|---|---|---|
| CN | 101775884 A | 7/2010 |
| CN | 102191847 A | 9/2011 |

(Continued)

OTHER PUBLICATIONS

Zandile Mavuso, Company Develops New Concrete Curing Blanket, Jun. 7, 2019.

(Continued)

*Primary Examiner* — Vincent Tatesure
(74) *Attorney, Agent, or Firm* — Mehrman Law Office; Michael J. Mehrman

(57) ABSTRACT

A dual-purpose concrete cover that includes a construction cover layer, a vapor retardant layer, and a wicking layer. An anti-snag scrim layer may be included under the wicking layer. One or more antimicrobial agents may be included in the wicking layer or other locations within the cover to prevent mold, mildew, bacterial and viral growth. While conventional concrete curing blankets often include a vapor barrier selected to keep the concrete surface wet well past the concrete curing period, the vapor retardant layer is designed to allow the dual-use cover to dry out at about the end of the concrete curing period so that the dual-use cover can remain in place as a construction cover after the curing period. The dual-purpose concrete cover is designed to fully dry prior to removal, which allows it to be reused, whereas conventional concrete curing blankets are typically discarded after a single use.

16 Claims, 16 Drawing Sheets

(56) References Cited

U.S. PATENT DOCUMENTS

| | | | |
|---|---|---|---|
| 7,182,989 B2 | 2/2007 | Higgins et al. | |
| 7,183,524 B2 | 2/2007 | Naylor et al. | |
| 7,345,004 B2 | 3/2008 | Zenker et al. | |
| 7,572,525 B2 | 8/2009 | McDonald | |
| 7,846,856 B2 | 12/2010 | Ghosh et al. | |
| 8,216,659 B2 | 7/2012 | Zafiroglu | |
| 9,091,049 B2 | 7/2015 | Walker | |
| 9,739,068 B2 | 8/2017 | Richards | |
| 10,226,047 B2 | 3/2019 | Gooch et al. | |
| 10,322,954 B2 | 6/2019 | Gooch | |
| 2002/0142125 A1 | 10/2002 | Seal | |
| 2004/0258870 A1 | 12/2004 | Oakey et al. | |
| 2006/0089067 A1 | 4/2006 | Baker, Jr. et al. | |
| 2009/0148596 A1 | 6/2009 | Carroll et al. | |
| 2010/0025886 A1 | 2/2010 | Carroll | |
| 2010/0197027 A1 | 8/2010 | Zhang et al. | |
| 2012/0077007 A1* | 3/2012 | McDonald | B28B 11/247 428/220 |
| 2013/0037989 A1* | 2/2013 | Wiercinski | E04B 1/665 264/259 |
| 2016/0229162 A1 | 8/2016 | Kafiah et al. | |
| 2017/0291385 A1 | 10/2017 | Carroll | |
| 2019/0022893 A1 | 1/2019 | Ozol et al. | |

FOREIGN PATENT DOCUMENTS

| | | |
|---|---|---|
| CN | 104870178 A | 8/2015 |
| CN | 208857158 U | 8/2018 |
| CN | 105209251 B | 9/2018 |
| DE | 1924575 A1 | 11/1970 |
| DE | 202016008503 U1 | 3/2018 |
| JP | H09241578 A | 9/1997 |
| JP | H10266544 A | 10/1998 |
| JP | 2000041513 A | 2/2000 |
| JP | 2004190477 A | 7/2004 |
| JP | 2004218219 A | 8/2004 |
| JP | 2005171547 A | 6/2005 |
| JP | 2009002144 A | 1/2009 |
| JP | 5169567 B2 | 3/2013 |
| KR | 100754424 B1 | 8/2007 |
| RS | 20140495 A1 | 4/2016 |
| WO | 2003064412 A1 | 8/2003 |
| WO | 2018187329 A1 | 10/2018 |
| WO | 2018187564 A1 | 10/2018 |

OTHER PUBLICATIONS

Reef Industries Inc, Concrete Curing Covers, Houston, TX, accessed Sep. 20, 2020.

Sirikamon Saengmeeanupharb et al., Antimicrobial effects of silver zeolite, silver zirconium phosphate silicate and silver zirconium phosphate against oral microorganisms, Jan. 2013.

Paris M. ALLEN1 and David Gottlieb, Mechanism of Action of the Fungicide Thiabendazole, 2-(4'-Thiazolyl) Benzimidazole, Dec. 1970.

Sean M. Walsh, Creating a Comprehensive Antimicrobial Concrete Coating System.

Florock, Antimicrobial Epoxy Flooring.

Floor Coverings in Healthcare Buildings, The Centre for Health Assets Australasia (CHAA), 2009.

Elantas Beck India Limited, Elantas Beck India Limited Construction Chemicals, Mar. 2018.

Seven Trust, Welcome to Seven Trust.

Concare Inc, Antimicrobial Floors & Walls.

https://www.biocidalpolymer.com, Polyhexidine, accessed Feb. 12, 2021.

* cited by examiner

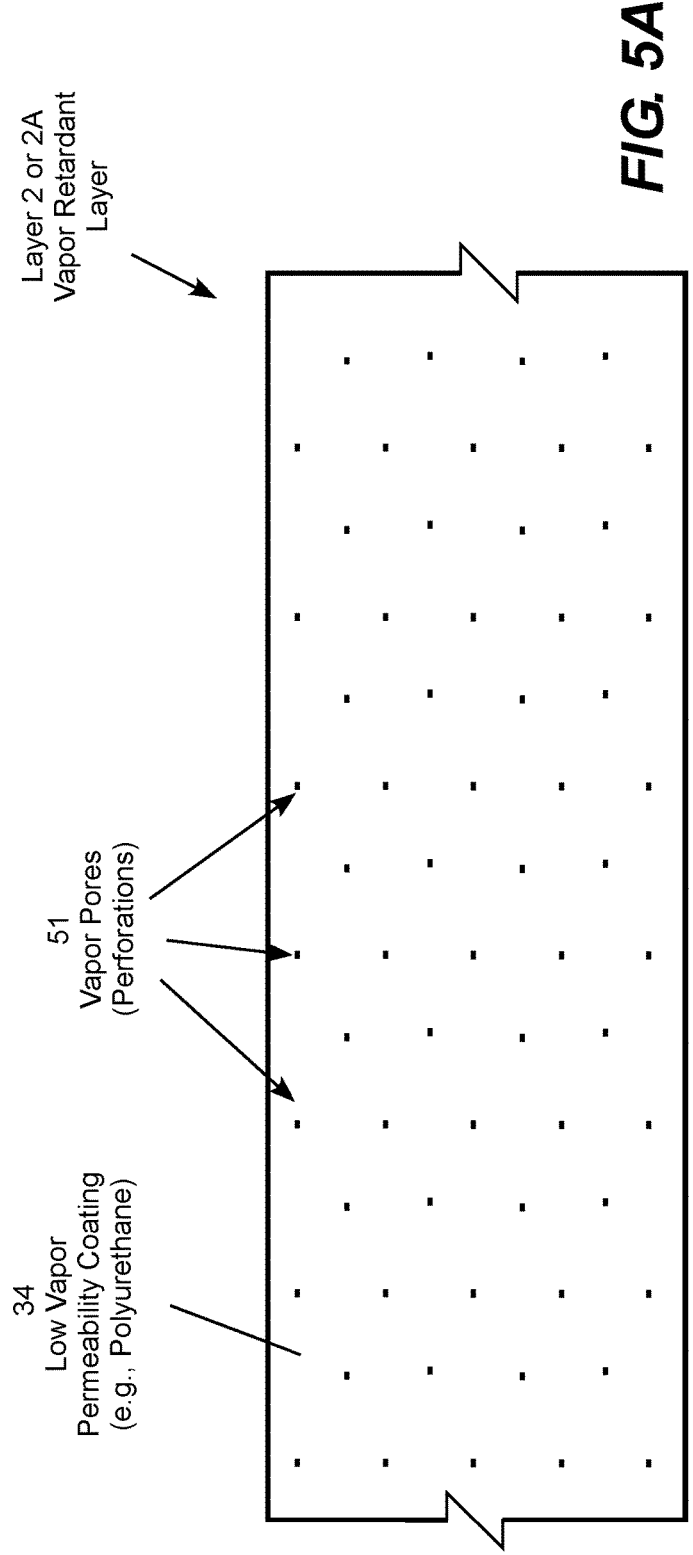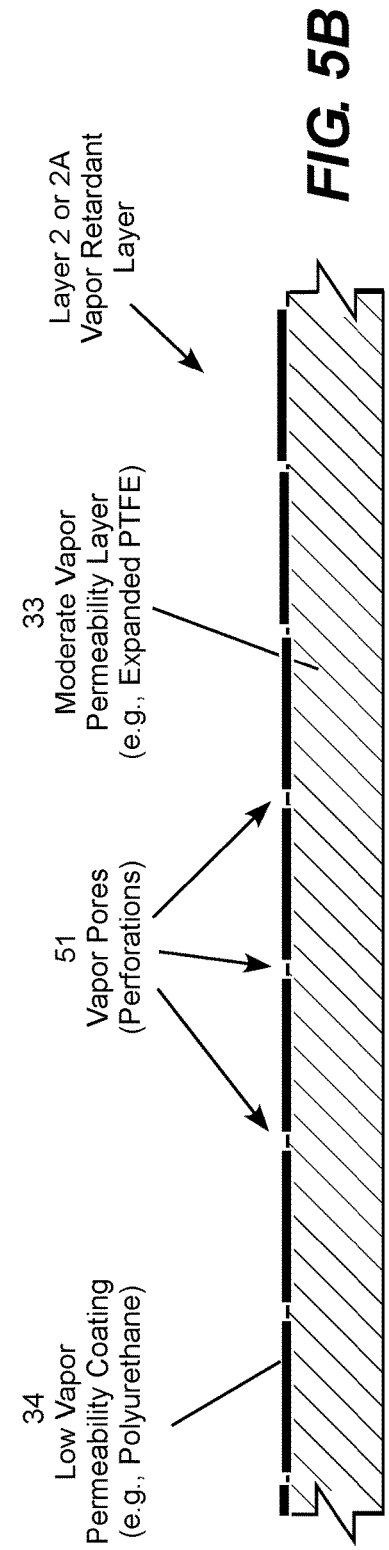

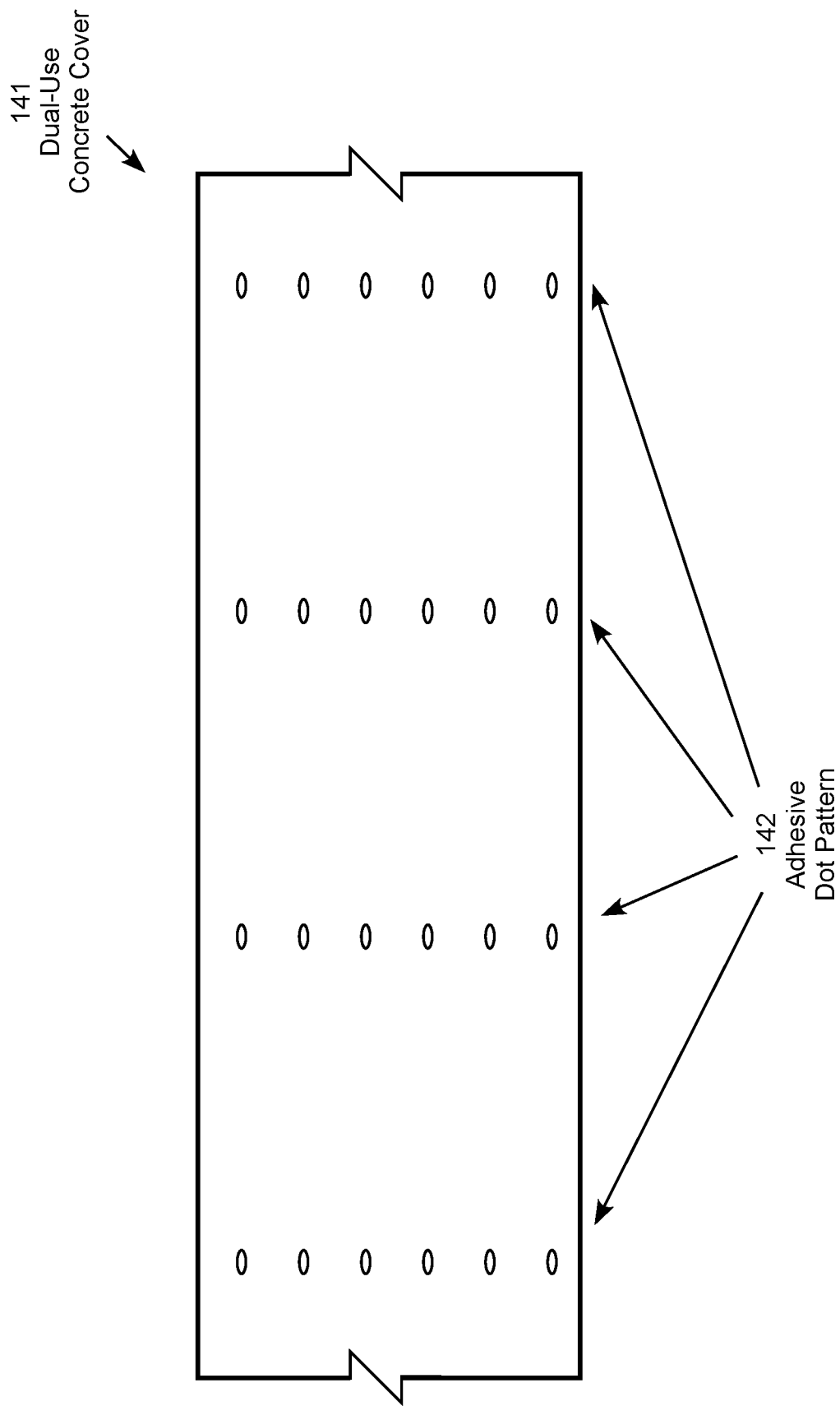

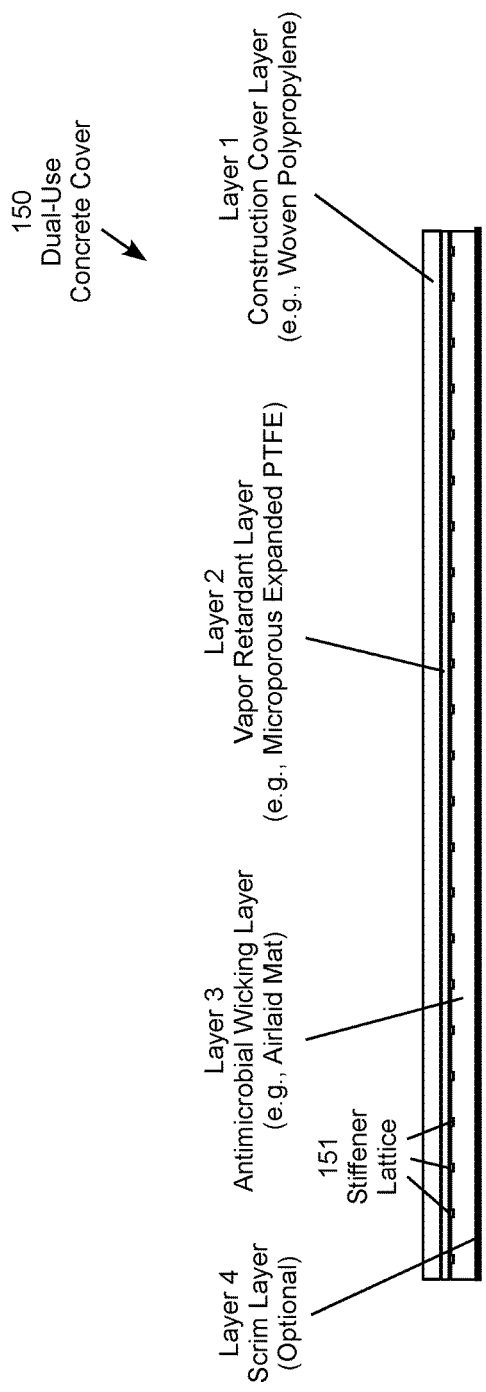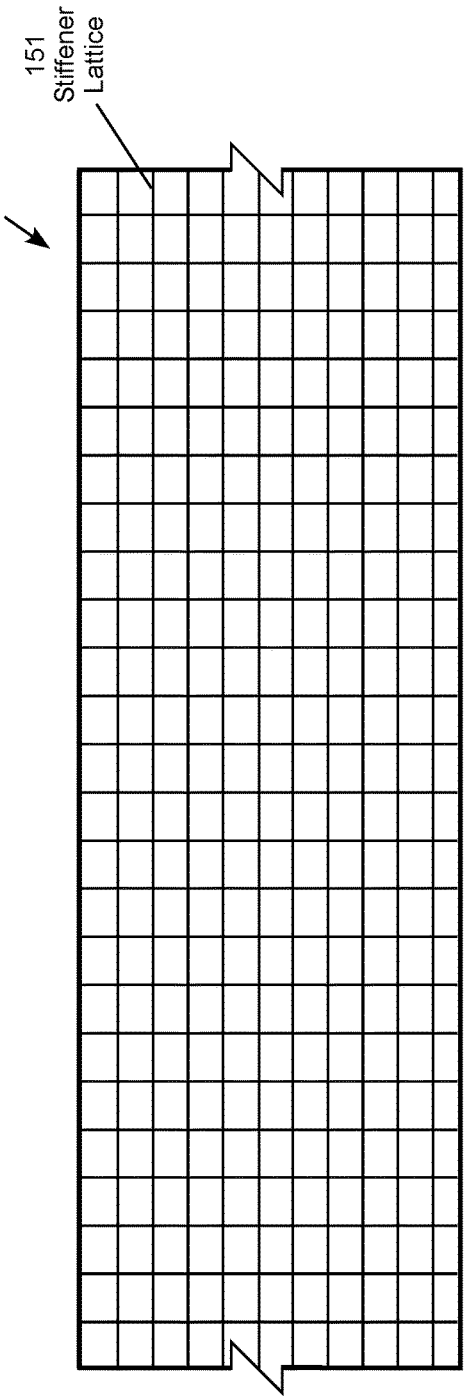

DUAL-USE CONCRETE COVER

TECHNICAL FIELD

The present invention relates to concrete curing blankets and construction covers and, more particularly, to a dual-use concrete curing blanket that remains in place as a construction cover after the concrete curing period.

BACKGROUND

Concrete curing blankets are temporary, roll-out floor covers designed to maintain moisture at the surface of a newly poured concrete slab during the concrete curing period, typically in the range of 14 to 28 days. Decades ago, heavy burlap sheets commonly used as concrete curing blankets required occasional rewetting to prevent them from drying out before the concrete slab had adequately cured. More recently, sophisticated conventional concrete curing blankets have been developed that maintain the desired moisture content for a sufficient period of time without rewetting. For example, concrete curing blankets have been developed that include a wicking layer facing the concrete surface and a vapor barrier to maintain moisture within the wicking layer. Super absorbent materials may also be included in the wicking layer. See, for example, McDonald, U.S. Pat. No. 7,572,525 and Richards et al., U.S. Pat. No. 9,739,068, which are incorporated by reference.

Although lighter weight and easier to handle than heavy burlap sheets, these conventional concrete curing blankets present several drawbacks. They generally remain sufficiently wet that they have to be removed while still wet at the end of the curing period to allow the construction work to proceed. Since drying the curing blanket is typically impractical, they are usually discarded after a single use. In addition, the conventional concrete curing blankets, even when dry, are not sufficiently rugged to support construction activity, such as fork lifts, material staging and scaffolding during the construction period. As a result, a protective construction cover is often rolled out after the curing blanket has been removed to protect the floor from damage during construction. Using two different blankets, one during the curing period and another during the post-curing construction period, is expensive, inconvenient, and typically wasteful since the curing blanket is usually discarded after a single use.

Conventional concrete curing blankets and construction covers often present another drawback from fungal growth, such as mold and mildew, growing underneath and within the covers while they remain in place for extended periods of time. This problem is exacerbated when the covers remains in place for longer periods of time, and in warm, humid climates without air conditioning. This concern extends beyond concrete covers since microbes including fungal growth, as well as bacteria and viruses, can also grow under and within floor covers more generally. For example, floor covers in hospitals, temporary medical facilities, schools, offices, homes, athletic facilities, etc. can suffer from unwanted microbial growth.

As a result, there is a persistent need for cost effective concrete curing blankets and construction floor covers. There is a further need for antimicrobial floor covers in general and, more particularly, for antimicrobial concrete curing blankets, construction floor covers, and other types of temporary floor covers.

SUMMARY

The present invention meets the needs described above in a dual-use concrete cover for a newly poured concrete slab, and in a method for using the dual-use concrete cover as a concrete curing blanket during the curing period of the concrete slab, and leaving the cover in place to serve as a protective construction cover after the concrete slab has cured. The dual-use concrete cover includes a construction cover first layer that is waterproof, exhibits a first water vapor permeability, and selected to protect the concrete slab during a construction period following the concrete curing period. The cover also includes a vapor retardant second layer that is waterproof and exhibits a second water vapor permeability, and a wicking third layer that is water absorbent and exhibits a third water vapor permeability. The vapor retardant second layer is positioned between the construction cover first layer and the wicking third layer and exhibits a vapor permeability that is less than the first and third water vapor permeabilities. The vapor permeability of the vapor retardant second layer is selected to cause the construction cover to exhibit a desired overall water vapor permeability, when placed against the newly poured concrete slab, that causes the wicking third layer to remain wet during a moisture retention period that approximates the concrete curing period of the newly poured concrete slab, and then becomes dry after the moisture retention period. For example, the moisture retention period may be in the range of 14 to 28 days.

In illustrative embodiments, the dual-use concrete cover includes one or more antimicrobial agents, such as an antifungal agent to mitigate or prevent mold and mildew growth. Additionally or alternatively, the antimicrobial agents may include an antibacterial agent to mitigate or prevent bacterial and virial growth. One or more antimicrobial agents may be located in one or more places within the cover. In a first option, one or more antimicrobial agents may be incorporated into the wicking layer mixture prior to extrusion of the airlaid mat forming the wicking layer. For example, antimicrobial agents may be incorporated into fibers or pellets, powders, water solutions, or non-aqueous solutions, such as alcohol solutions, introduced into the wicking layer mixture prior to extrusion. As another option, one or more antimicrobial agents may be spread, for example by sprayed, onto one of more of the layers as the layers are brought together in a web fabrication process.

In a specific representative example, the construction cover first layer is fabricated from woven polypropylene exhibiting a weight in the range of 6 to 10 ounces per square yard; the vapor retardant second layer is fabricated from expanded PTFE exhibiting a weight in the range of 0.5 to 1.5 ounces per square yard; and the wicking third layer is fabricated from an airlaid mat that incudes cellulose fluff pulp and binder fibers exhibiting a weight in the range of 4.0 to 7.5 ounces per square yard. As an option, the cover may include a scrim fourth layer next to the wicking third layer fabricated from woven or nonwoven polypropylene, cotton, fiberglass, polyester or blend exhibiting a weight in the range of 0.5 to 3.0 ounces per square yard. As another option, the vapor retardant second layer may have a coating that includes polyurethane, which may be perforated to obtain a cover exhibiting a desired water retention period. As yet another option, the cover may include a stiffener lattice that is, for example, positioned between the vapor retardant second layer and the wicking third layer.

In view of the foregoing, it will be appreciated that the dual-use concrete cover represents a significant improvement in concreter curing blankets, concrete construction covers, and antimicrobial roll-out floor covers in general. The foregoing relates only to the exemplary embodiments of the present invention, and numerous changes may be made therein without departing from the spirit and scope of the invention as defined by the appended claims.

BRIEF DESCRIPTION OF THE FIGURES

FIG. 5A is a conceptual top view of the vapor retardant layer.

FIG. 5B is a conceptual side view of the vapor retardant layer.

FIG. 14 is a conceptual top view of a fourth adhesive pattern for a dual-use concrete cover.

FIG. 15A is a conceptual side view of a stiffener layer for a dual-use concrete cover.

FIG. 15B is a conceptual top view of a stiffener layer for a dual-use concrete cover.

DETAILED DESCRIPTION

Embodiments of the invention may be realized in a dual-purpose concrete cover that includes a construction cover layer, a vapor retardant layer, and a wicking layer. An anti-snag scrim layer may be included under the wicking layer and a stiffener lattice layer may be included, for example between the vapor retardant layer and the wicking layer. One or more antimicrobial agents may be included in the wicking layer or other locations within the cover to prevent mold, mildew, bacterial and viral growth. While conventional concrete curing blankets often include a vapor barrier selected to keep the concrete surface wet well past the concrete curing period, the vapor retardant layer is designed to allow the dual-use cover to dry out at the end of a moisture retention period that approximates the end of the concrete curing period so that the dual-use cover can remain in place as a construction cover after the curing period. The dual-purpose concrete cover is designed to fully dry prior to removal, which allows it to be reused, whereas conventional concrete curing blankets are typically discarded after a single use.

Figure 1:
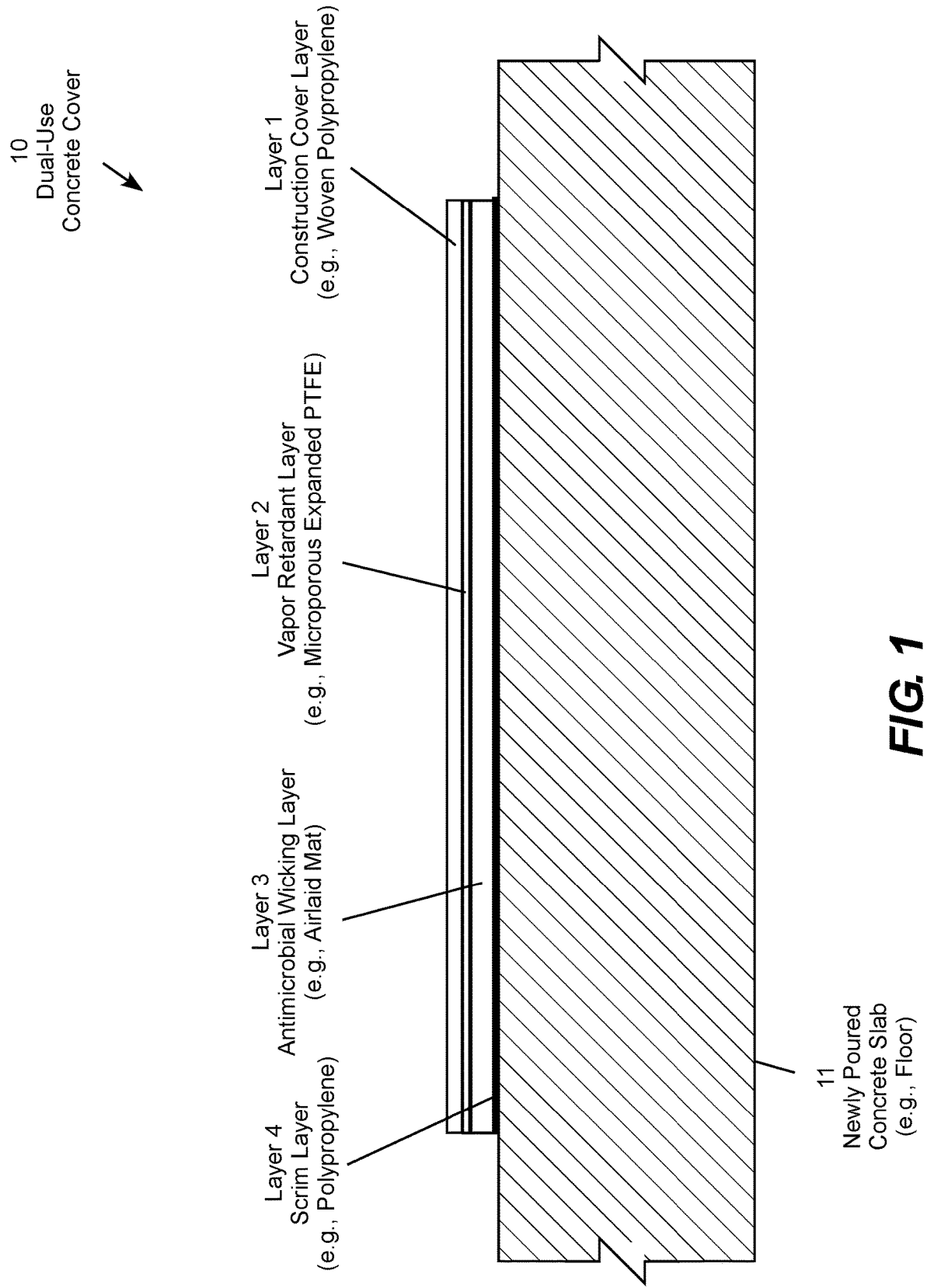
FIG. 1 is a conceptual side view of a dual-use concrete cover positioned on a concrete slab.

FIG. 1 is a conceptual side view of a dual-use concrete cover 10 positioned on a concrete slab 11. The dual-use concrete cover 10 is a roll-out, temporary concrete curing blanked designed to remain in place as a construction cover after the curing period. It includes a construction cover layer 1 on top, vapor retardant layer 2 below the construction cover layer, and a wicking layer 3 below the vapor retardant layer. An anti-snag scrim layer 4 may also be included under the wicking layer. In a representative embodiment, the construction cover layer 1 is fabricated from woven polypropylene, the vapor retardant layer 2 is fabricated from microporous expanded Polytetrafluoroethylene (PTFE) often referred by the tradename Teflon®, the wicking layer 3 is fabricated from cellulose fluff pulp with bi-component binder fibers and other additives, and the anti-snag scrim layer 4 is a commercially available lightweight woven or nonwoven polypropylene, cotton, fiberglass, polyester or blend scrim material.

The construction cover layer 1 and the vapor retardant layer 2 are waterproof, while the scrim layer 4 and the wicking layer 3 are pervious to water and water vapor. The construction cover layer 1, the scrim layer 4, and the wicking layer 3 have a relatively high permeability to water vapor, while the vapor retardant layer 2 exhibits a lower permeability to water vapor selected to slow the vapor dispersion through the concrete cover 10 and thereby allow the cover to dry out at the end of a moisture retention period that approximates the curing period of the newly poured concrete slab. In a representative embodiment, the vapor retardant layer 2 may include a microporous expanded PTFE layer with a vapor permeability that is lower than the vapor permeability of the other layers. The vapor permeability of the vapor retardant layer 2 may be further reduced by applying a coating having an even lower vapor permeability, such as polyurethane. The polyurethane coating may be perforated to give the vapor retardant layer 2 a vapor permeability between the vapor permeability of the PTFE layer and the vapor permeability of the polyurethane coating. During a web fabrication process, the coated PTFE layer may pass through a drying unit to dry the polyurethane coating prior to perforation. The drying unit described in the specification may utilize one or more of infrared heaters, hot air convection, extended sinuous web paths, heated rollers, or other suitable web drying techniques.

Adhering the layers together stiffens the cover 10 to mitigate gathering, folding or puckering when wheeled devices, such as forklifts, air compressors, gurneys, medical equipment and the like are rolled over the cover, which could otherwise jam or trip the wheels or damage the cover. Adding a polyurethane coating to the vapor retardant layer 2 further stiffens the cover 10 for this purpose. An additional stiffener layer, such as plastic strips or lattice located between the vapor retardant second layer 2 and the wicking third layer 3, may be included to provide additional resistance to gathering, folding or puckering without impeding rolling up the cover. For example, high density polyethylene (HDPE), acrylonitrile butadiene styrene (ABS), polycarbonate or Nylon plastic strips or lattice are illustrative choices for the plastic stiffener layer. An illustrative stiffener layer may include, for example, a square lattice pattern in the range of 4 to 10 inches with cross members in the range of 0.125 to 0.25 inches wide by 0.0625 to 0.125 inches thick. Locating the plastic stiffener lattice between the vapor retardant layer 2 and the wicking third layer 3 allows the stiffener lattice to settle into the airlaid mat forming the wicking layer with the vapor retardant layer passing over the lattice to provide a smooth rolling surface on top of the construction cover layer 1 that resists gathering, folding or puckering without impeding rolling up the cover 10. This makes the cover 10 an effective surface for wheeled devices, while providing for much easier and faster "rolling out" and "rolling up" in comparison to tile or panel temporary flooring options.

In a representative embodiment, the construction cover layer 1 is a heavy duty tarp material, similar to conventional construction covers, selected to protect the underlying concrete surface from fork lift operations, material staging, scaffolding, and other construction activities. The construction cover layer 1 should prevent water, oil, paint, grime and dust from penetrating through. The construction cover layer 1 may be a woven material, such as high density woven polypropylene or polyethylene, with a relatively high permeability to water vapor, typically higher than the water vapor permeability of the vapor retardant second layer 2. In a specific example embodiment, the construction cover may be fabricated from woven polypropylene exhibiting a weight in the range of 6-10 ounces per square yard.

The vapor retardant layer 2 is designed to allow the dual-use cover 10 to dry out around the end of the curing period so that the dual-use cover can remain in place as a construction cover after the concrete curing period. The vapor retardant layer 2 is selected to be waterproof while impeding but not preventing water vapor from passing through. While many conventional concrete curing blankets include a vapor barrier selected to keep the concrete surface wet well past the concrete curing period, the vapor retardant layer 2 is designed to allow the dual-use cover to dry out at about the end of the curing period so that the dual-use cover can remain in place as a construction cover after the curing period. The vapor retardant layer 2 may be a microporous membrane coated with a less breathable component, such as polyurethane, to reduce the rate of water vapor transmission through the cover. The less breathable component may be perforated to achieve a desired rate of water vapor transmission through the cover between the water vapor transmission of the microporous membrane and the water vapor transmission of the coating. The coating may be perforated to achieve a desired water vapor transmission rate through the vapor retardant layer 2, and thus produce a dual-use concrete cover 10 that exhibits a desired water retention period when used in a particular concrete curing environment, such as an outdoor humid environment, an indoor airconditioned environment, and so forth.

In a representative embodiment, the vapor retardant layer 2 may be a microporous membrane fabricated from expanded PTFE. Since PTFE has a moderate vapor permeability, the rate of water vapor evaporation can be slowed by adhering or coating the PTFE material with a material with a lower vapor permeability. For example, the PTFE material can be coated with polyurethane (PE), which has a lower vapor transmission rate than the expanded PTFE material. To further refine the vapor permeability, a vapor permeability between that of PTFE and PE can be obtained by coating the PTFE with PE and then perforating the PE coating. This also allows a variety of dual-use covers to be fabricated suitable for different concrete curing environments, for example a high-evaporation-rate dual-use cover with an uncoated PTE layer may be specified for use in a high humidity environment, such as an outdoor application in the southern U.S. in the summer months. Similarly, a mid-evaporation-rate dual-use cover with a PTFE layer with a perforated PE coating may be specified for use in a moderate humidity environment, such as a less humid outdoor application. As another example, a low-evaporation-rate dual-use cover with a PTFE layer with an unperforated PE coating may be specified for use in a low humidity environment, such as indoor airconditioned spaces. In a representative embodiment, the vapor retardant layer 2 is a microporous membrane of expanded PTFE exhibiting a weight in the range of 0.5 to 1.0 ounces per square yard. The weight will be somewhat higher in embodiments coated with PE, such as 1.0-1.5 ounces per square yard. Layers with thicker coating or multiple coating layers may have higher weights.

The wicking layer 3 is typically fabricated by an airlaid process. The term "airlaid" generally refers to a fibrous structure formed primarily by a process involving extrusion of air-entrained fibers onto a mat, typically along with binder fibers, usually followed by densification and thermal bonding. In addition to traditional thermally bonded airlaid structures with bicomponent binder fibers, those formed with non-tacky binder materials and bonding techniques other than bicomponent binder fibers set by thermal bonding may be used. For example, binder additives, such as latex, may be used in addition to or instead of bicomponent binder fibers.

To provide additional illustrative examples, the term "airlaid" also includes "co-formed" mats, which are produced by combining air-entrained dry, dispersed cellulosic fibers with melt blown synthetic polymer fibers while the polymer fibers are still tacky. "Airlaid" also includes an "airformed" web to which one or more binder materials are added after extrusion. Binders may be added by extrusion melting, spray nozzles, direction injection or impregnation, vacuum drawing, foam impregnation, and so forth. Solid binder powders, prills, fibers, liquid or gels also may be included in the airlaid mixture prior to extrusion, or they may be added during or after extrusion by mechanical, pneumatic, or any other suitable technique.

In a particular embodiment, the wicking layer 3 contains bi-component or multibond fibers, fluff cellulose pulp, ethylene vinyl acetate, and latex. In a representative example, about 5-50%, preferably about 30%, of the fibers are synthetic bonding fibers. Synthetic fibers contribute as much as 3.8-4.25%, preferably about 4%, by weight to the airlaid wicking layer. Bi-component and multibond fibers are coaxial fibers having an inner component with a higher melting temperature than an encasing outer component. When heated, the outer component melts for bonding with other elements, while the inner component does not melt, thus lending integrity and strength to the bonded material. The inner and outer components may be selected from polypropylene, polyethylene or other compositions suitable for the purposes described.

The wicking layer 3 may also include 50-89%, preferably about 50%, natural cellulose fluffed pulp fiber. The fluff pulp may be derived from southern softwood, northern softwood, southern hardwood, northern hardwood, kanaf or *eucalyptus* fibers. These materials provide short fibers that offer great surface area for trapping and absorbing water. The fibers derived from protein based, cotton, agave, plant stalk (bast) fibers of other mats tend to be much longer, hence afford less surface area for trapping and absorbing water. These longer fibers also generally have waxes, resins and some lignin present that discourage entrapping water. These longer fibers are typically less absorbent and exhibit geometries that are not as favorable as natural cellulose fluff fabricated from soft and/or hardwood fibers. Further, the natural pulp fibers also tend to provide greater tensile strength than the fibers of other mats.

The fluff pulp for the wicking layer 3 may be obtained from a Kraft process, rather than mechanical pulping.

Mechanical pulping typically does not produce a clean product, free of the waxes, resins, silicone, turpentine and other undesired components present in the virgin natural wood materials. Bleached Kraft pulp provides the best known absorption capabilities by producing clean cellulose. The Kraft process also produces a bulkier cellulose with a white absorptive component that prevents discoloration of a concrete surface, such as the discoloration that commonly occurred with "burlap style" concrete curing blankets. Certain additives, such as ethylene vinyl acetate and latex, add strength and reduce dusting.

One or more bonding agents, such as ethylene vinyl acetate and latex, may be added into the airlaid mixture prior to extrusion, sprayed onto the airlaid mat during or after extrusion, or they may be applied to the natural fibers or form part of the bi-component or multibond fibers prior to the airlaid mat fabrication process. The bonding agents aid in strengthening the adhesion among the bi-component or multibond fibers and other materials in the wicking layer 3. The bonding agents may contribute as much as 5-35%, preferably about 20%, by weight. Another embodiment of the wicking layer 3 contains 5-20% super absorbent fibers. Super absorbent fibers are absorbent fibers coated with and absorbent material.

The wicking layer 3 may be thermally bonded to a backing and may include a laminated, extruded or coated polyethylene or polymer latex material. For example, the latex material formed into or sprayed onto the airlaid mat may be a two-part composition that renders it insoluble in water. The water insolubility of the latex discourages disintegration of the airlad mat when it gets wet during concrete curing, which would lead to imperfections in the finished surface of a concrete slab. As an option, the airlaid mat may be spray coated with latex, which lowers production costs.

One part of the latex composition may be a high-viscosity polymer filler agent, while the other part may be a water resistant agent obtained by polymerization. A binder dispersed in water forms a film by fusion of the plastic filler particles as the water evaporates during manufacturing or curing. The wicking layer 3 may be bonded together with a water resistant adhesive having a softening point of 21 degrees Fahrenheit. In a representative embodiment, the wicking layer 3 may have a weight in the range of 4.0 to 7.5 ounces per square yard.

The airlaid fabrication of the wicking layer 3 can tend to snag. Since the dual-use roll 10 is designed for reuse two, three or more times, it may justify adding an optional scrim layer 4 under the wicking layer to prevent snagging. The scrim layer 4 should be a relatively thin, light and slick layer selected to minimize snagging. In a particular embodiment, the scrim layer 4 may be a woven or nonwoven polypropylene, cotton, fiberglass, polyester or blend scrim material exhibiting a weight in the range of 0.5 to 3.0 ounces per square yard that is highly pervious to water and water vapor.

In an illustrative embodiment, the dual-use cover 10 also includes a hotmelt thermoplastic adhesive with a melting point of about 210 degrees Fahrenheit applied between the layers of the cover. The hotmelt adhesive may be applied in strips, sinuous strips, or dots occupying only a small fraction of the area of the cover to avoid blocking water vapor transmission through the cover.

As an option, one or more antimicrobial agents may be incorporated into or applied to one or more of the layers. In particular, the wicking layer 3 may include one or more antimicrobial agents, which may be applied to the wicking layer in several different ways. The antimicrobial agents typically include an antifungal agent to prevent or reduce mold and mildew growth. The antimicrobial agents may also include an antibacterial agent to prevent or reduce bacterial and viral growth. The antimicrobial agents are typically incorporated into the wicking layer during the airlaid mat fabrication process by adding the agents to the airlaid mixture prior to extrusion. Additionally or alternatively, they may be incorporated into the wicking or binder fibers through a pre-treatment applied prior to the airlaid mat formation process. Tsubai et. al, U.S. Pat. No. 5,888,526 and Ghosh et al., U.S. Pat. No. 7,846,856, which are incorporated by reference, describe pre-treatment processes for incorporating or applying the antimicrobial agents to the pulp or binder fibers prior to formation of the airlaid mat. Additionally or alternatively, antimicrobial agents in liquid or powder format may be applied (e.g., spread, sprayed) to any layer or between any layers after extrusion of the airlaid mat during web fabrication of the concrete cover 10. The web may pass through a drying unit to dry, bind or activate any antimicrobial agent(s) prior to rolling the finished concrete cover.

Since the dual-use cover 10 is designed to be left in place for an extended period, an antifungal agent selected to reduce or prevent mold and mildew is particularly desirable. Antibacterial agents selected to reduce or prevent bacterial and viral growth may also be included, which may be particularly desirable for hospitals, temporary medical facilities, temporary military medical facilities, virus inoculation sites, clinics, schools, offices, homes, athletic facilities. Although any antimicrobial agent found to be effective may be utilized, representative antimicrobial agents include: zinc pyrithione, (TBZ) (thiazolylbenzimidazole), quaternary ammoniums (QACs or quats), silane QACs (si-quats), n-halamines, isothiazolinone, tiabendazole, metals and metal salts (e.g., salts of Ag, Ti, Zn, Cu, etc.), silver zeolite, silver zirconium phosphate, silver zirconium phosphate silicate, polyhexamethylene biguanide (PHMB), silver nitrate, copper sulfate, zinc nitrate, silver chloride, copper chloride, zinc chloride, triclosan, chitosan, sodium percarbonate, calcium hypochlorite.

In general, the antimicrobial agents should be added in quantities found to be effective. Antimicrobial agents in powder form, or dissolved in water or alcohol, as appropriate, or supplied in polymer liquid or pellet form may typically be added directly into the airlaid fiber mixture prior to extrusion during the airlaid web formation process. Powdered additives may be dissolved to prevent clogging the extruder. For example, selected agents may be applied individually or in combination contributing 2% to 30% by weight of the wicking layer 3. A specific illustrative embodiment includes zinc pyrithione contributing 10% by weight of the wicking layer 3. Another specific example includes equal parts silver nitrate, copper sulfate, and zinc nitrate with a combined contribution of 10% by weight of the wicking layer 3.

Since tiabendazole (TBZ) is not water soluble, it is typically dissolved in alcohol or another solvent prior to adding it to the airlaid mixture prior to extrusion, which may additionally or alternatively be sprayed onto the airlaid mat or another layer after extrusion. In either case, care should be taken to properly limit the amount of alcohol or another solvent used because other components of the airlaid mat or the hotmelt adhesive may also be dissolved by the solvent. For example, it may be suitable to limit the amount of TBZ solute to 0.5% to 2% by weight of the wicking layer. It should also be appreciated that adding TBZ solute may help to soften the airlaid mixture to facilitate extrusion, for example when other agents are added in powder form, such as zinc pyrithione or metal salts. The mixture of antimicrobial agents in various embodiments will therefore vary depend on the quantities, types and formats of the agents selected, and should be selected carefully when adding the agents to the airlaid mixture prior to extrusion. Adding one or more antimicrobial agents to the airlaid mixture prior to extrusion is presently considered the primary treatment approach. Water soluble agents are preferred for spray application to avoid adding solvents that may adversely impact the hotmelt glue applied between the layers of the cover.

Figure 2:
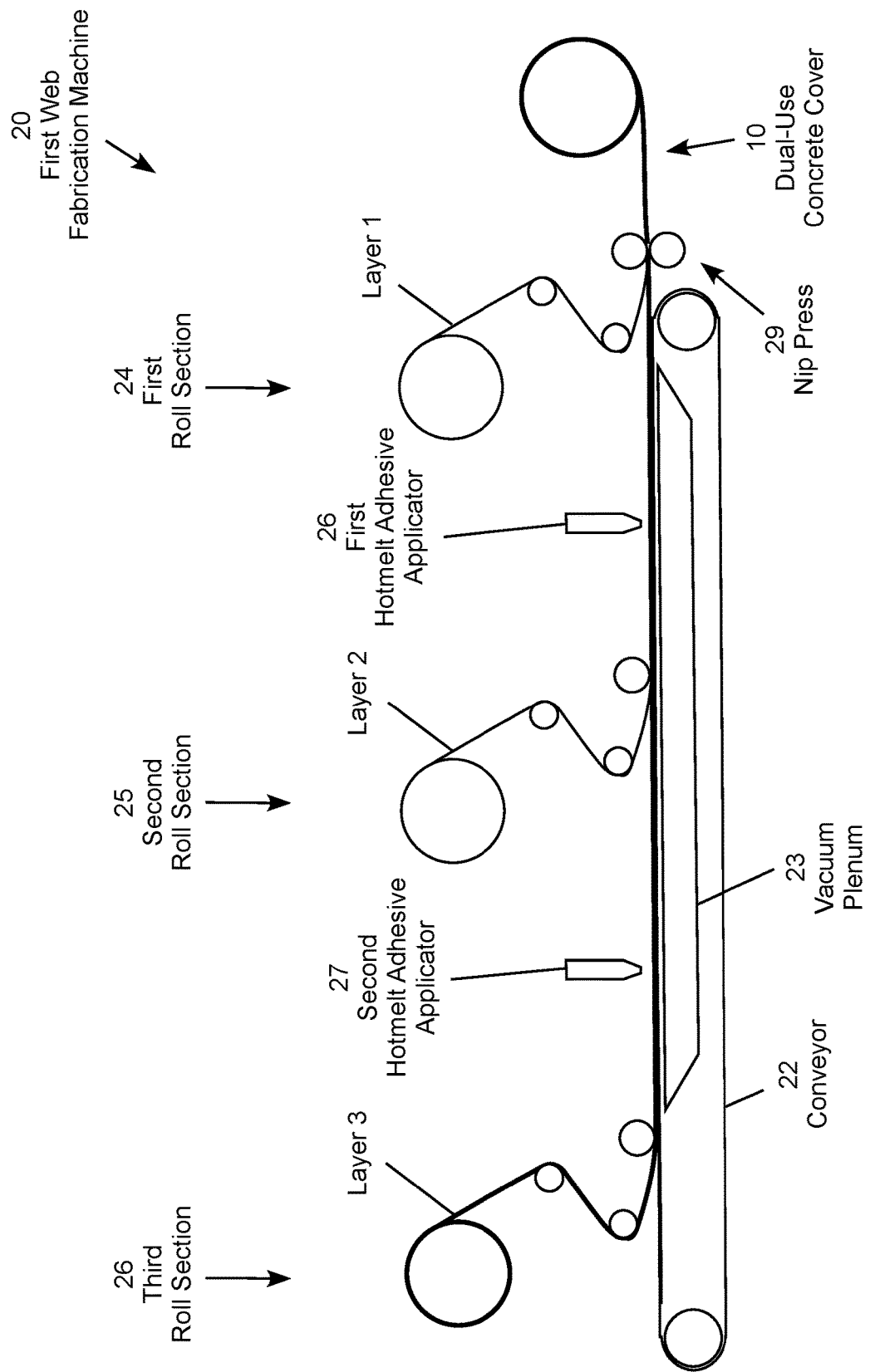
FIG. 2 is a conceptual process diagram of a first web fabrication machine.

FIG. 2 is a conceptual process diagram of a first web fabrication machine 20 for manufacturing the dual-use concrete cover 10, which includes layers 1, 2 and 3 shown in FIG. 1. The machine 20 includes a conveyor 22 and a vacuum plenum 23 typically utilized in web fabrication. A first roll section 24 unrolls the construction cover layer 1 on the top of the web carried by the conveyor 22, a second roll section 25 unrolls the vapor retardant layer 2 onto the web under the construction cover layer 1, and a third roll section 26 unrolls the wicking layer 3 onto the web under the vapor retardant layer 2. A fourth roll section may be included to unroll the scrim layer 4 onto the web under the wicking layer 3. A first hotmelt adhesive applicator 26 applies an adhesive between layer 1 and layer 2, and a second hotmelt adhesive applicator 27 applies and adhesive between layer 2 and layer 3. If a scrim layer 4 is included a third hotmelt adhesive applicator applies an adhesive between layer 3 and layer 4. After the layers and adhesives are brought together, they pass through a nip press 29 before the dual-use concrete cover 10 is spooled into a roll. As an option for the example shown in FIG. 2, one or more antimicrobial agents may be incorporated into the wicking layer 3 prior to forming the concrete cover 10 through the process shown in FIG. 2.

Figure 3:
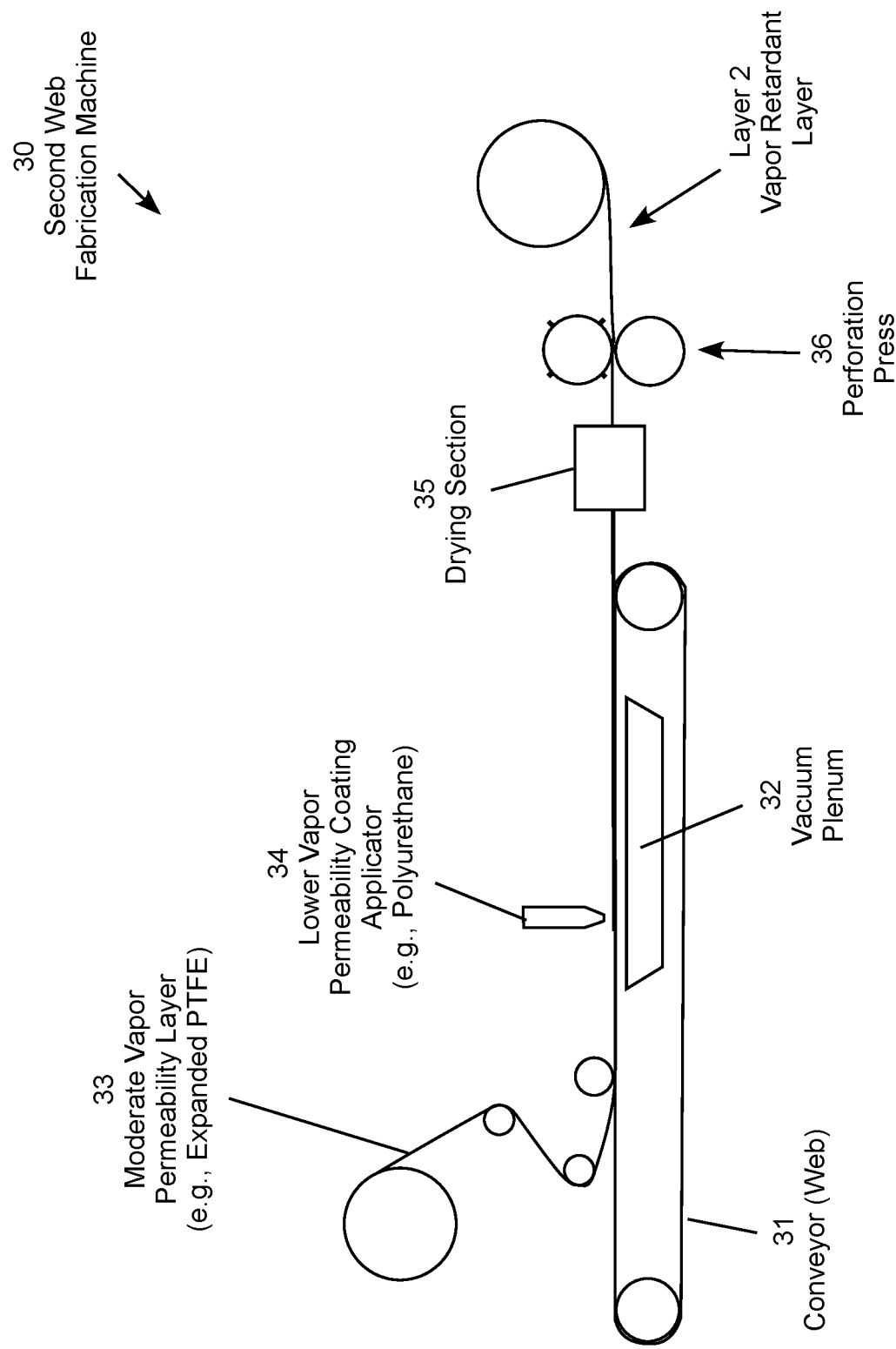
FIG. 3 is a conceptual process diagram of a second web fabrication machine.

FIG. 3 is a conceptual process diagram of a second web fabrication machine 30 for manufacturing the vapor retardant layer 2. The machine 30 includes a conveyor 31 and a vacuum plenum 32 typically utilized in web fabrication. A moderate vapor permeability mat 33, such as microporous membrane of expanded PTFE, is unrolled onto the conveyor 31. In this example embodiment, to reduce the vapor permeability of the vapor retardant layer 2, an applicator 34 applies a coating of a lower vapor permeability material, such as polyurethane, onto the moderate vapor permeability mat 33. The applicator 34 may spray, roll, brush or use another suitable process to apply the coating. The vacuum plenum 32 draws air through the mat 33 to dry the coating, which may pass through an additional drying section 35 if additional drying is required. To increase vapor permeability, the coated mat 33 may then pass through a perforation press 36.

Figure 4:
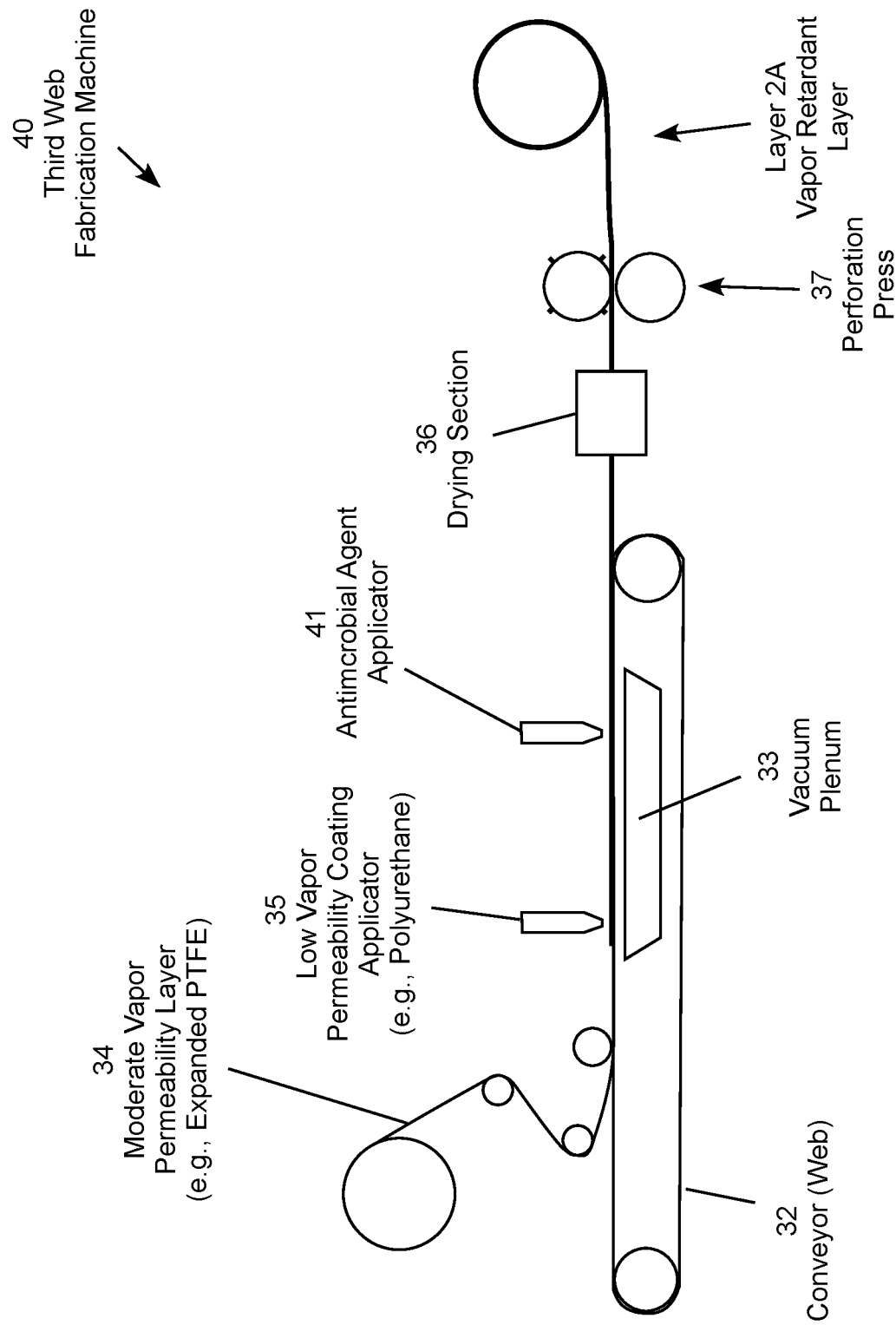
FIG. 4 is a conceptual process diagram of a third web fabrication machine.

FIG. 4 is a conceptual process diagram of a third web fabrication machine 40 for manufacturing an alternative vapor retardant layer 2A. This machine is similar to the machine 30 shown in FIG. 3, except that an applicator 41 has been added to apply one or more antimicrobial agents to the mat 33, which, in alternative embodiments, may be a coated or uncoated mat. As the expanded microporous mat 33 and the coating 34 are typically waterproof, a thin layer of liquid antimicrobial agent is typically applied to this surface of the cover 10.

FIG. 5A is a conceptual top and FIG. 5B is a conceptual side view of the vapor retardant layer 2 or 2A. The perforation press 36 shown in FIGS. 3 and 4 leaves a repeat pattern of perforations represented by the vapor pores 51 called out in FIGS. 5A and 5B. The coating may be eliminated, or the thickness of the coating may be adjusted, or the number or size of the perforations may be adjusted to obtain a cover 10 with a desired vapor permeability. A selection of different covers with different vapor permeabilities may be fabricated by varying these features.

Figure 6:
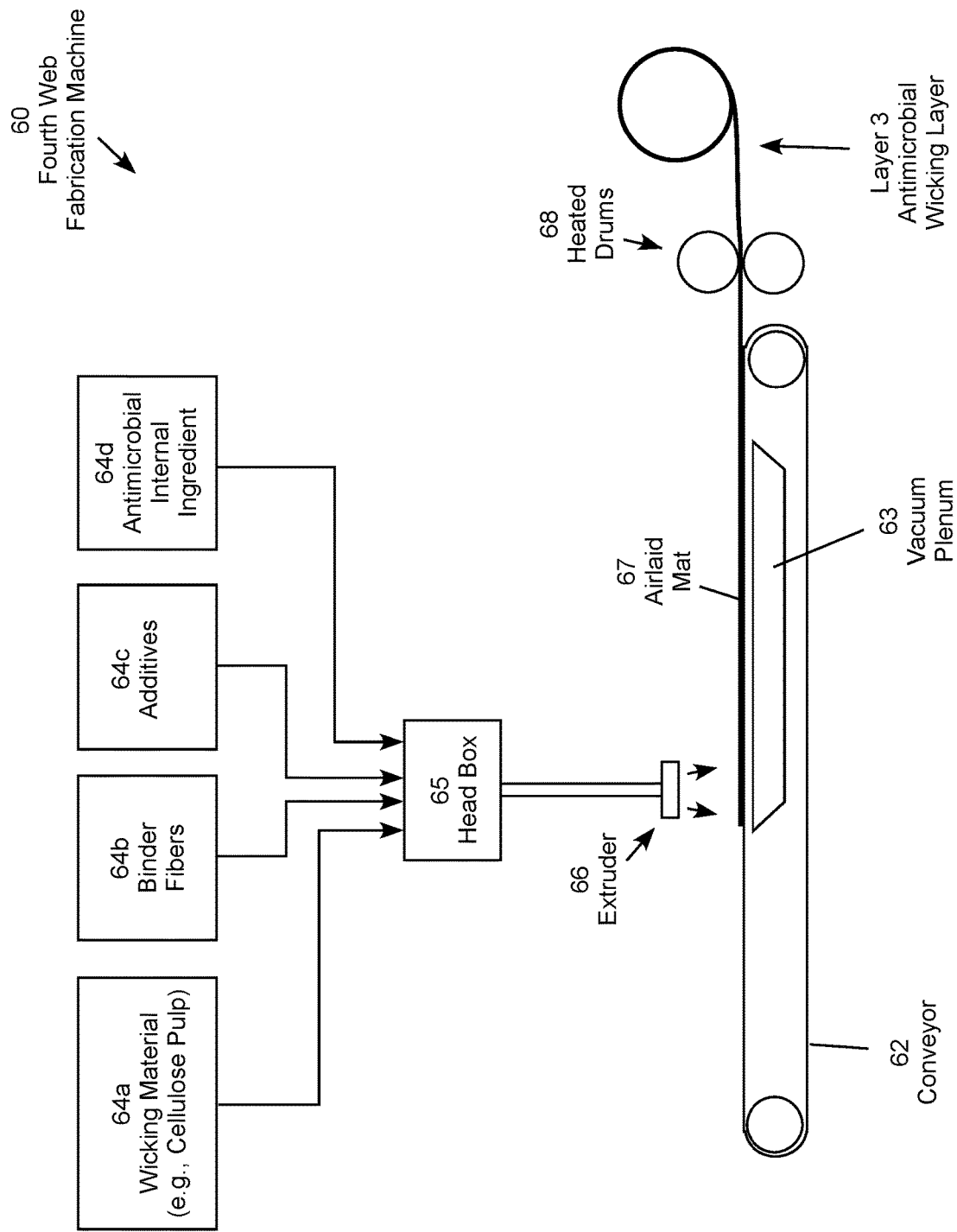
FIG. 6 is a conceptual process diagram of a fourth web fabrication machine.

FIG. 6 is a conceptual process diagram of a fourth web fabrication machine 60 for fabricating an antimicrobial wicking layer 3. The machine 60 includes a conveyor 62 and a vacuum plenum 63 typically utilized in web fabrication. In this particular example, a wicking material (e.g. cellulose fluff pulp) 64a, binder fibers 64b (e.g., bi-component polymer fibers), additives 64c (e.g., ethylene vinyl acetate, latex) and other desired components of a conventional airlaid mat are brought together into an extruder head box 65. According to an aspect of the invention, one or more antimicrobial internal ingredients 65c are introduced directly into the extruder head box 65, which incorporates the antimicrobial internal ingredients into the airlaid material as it is forced through an extruder 66 onto the conveyor 62 forming the airlaid mat 67. The vacuum plenum 63 draws air through the airlaid mat 67 to dry the mat, which passes between heated drums 68 to compress, set binders, and further dry the mat.

FIG. 6 is presently considered to illustrate the most efficient approach for introducing antimicrobial agents into the cover. Impregnating the antimicrobial agents into the wicking layer 3 is also considered to be the most effective place to incorporate the antimicrobial agents into the cover because the wicking layer as designed to absorb and spread water, which is generally considered necessary for growth of microbes, such as mold, mildew, bacteria and viruses. Introducing the antimicrobial agents into the head box during the airlaid mat formation process is also an efficient way to incorporate the antimicrobial agents into the cover because it avoids the need for additional applicators, dryers or other processes. Nevertheless, antimicrobial agents can alternatively or additionally be applied to other layers, as shown in other figures. The other layers of the cover 10 are typically waterproof, which generally allows surface treatment. Additionally or alternatively, any or all of the layer may incorporate or be pre-treated with antimicrobial agents prior to web formation of the cover 10.

Figure 7:
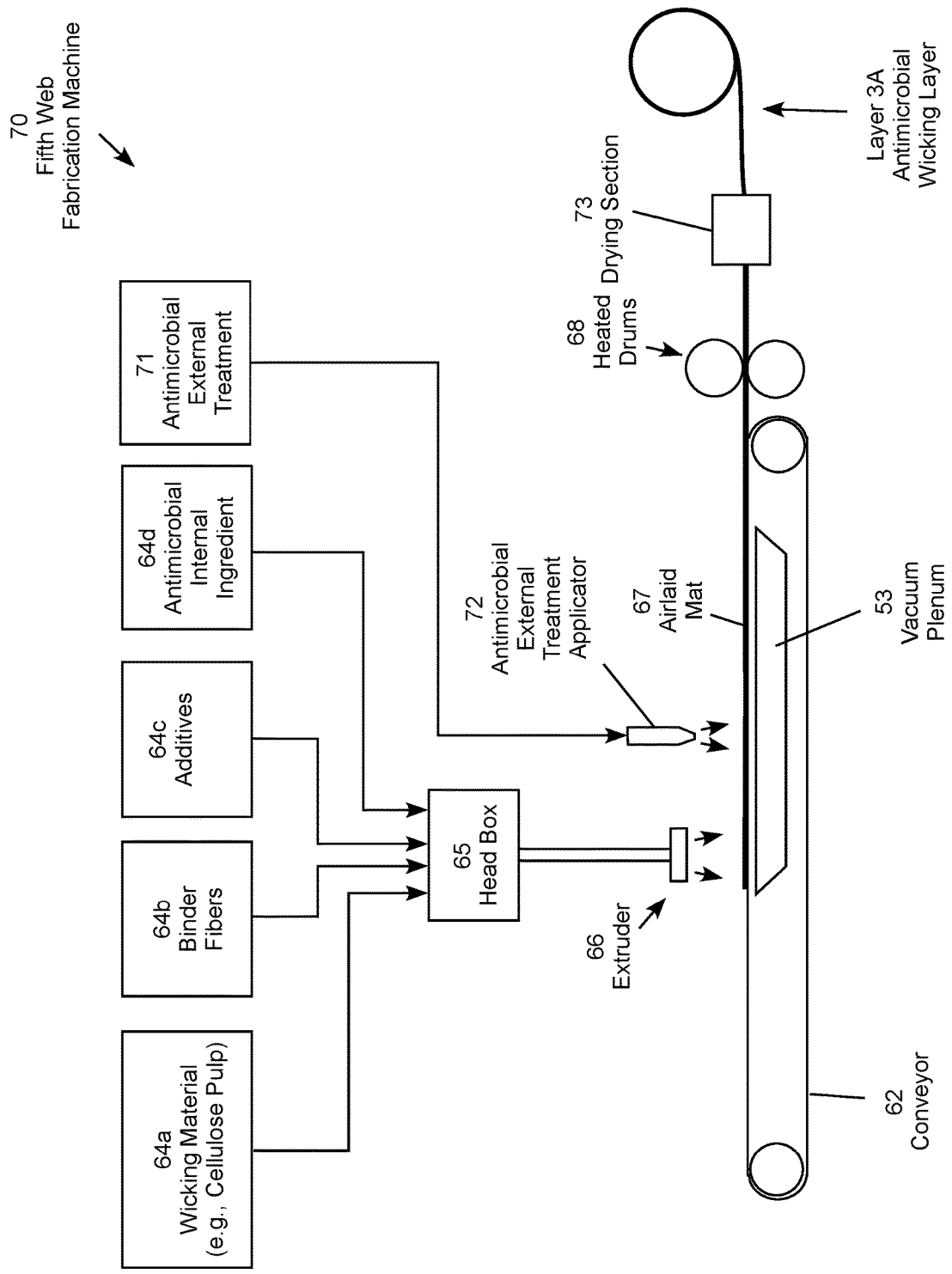
FIG. 7 is a conceptual process diagram of a fifth web fabrication machine.

For example, FIG. 7 is a conceptual process diagram of a fifth web fabrication machine 70 for fabricating an alternative antimicrobial wicking layer 3A. The machine 70 is similar to the fourth web fabrication machine 60 shown in FIG. 6, except that an additional or alternative applicator 72 has been added to apply an antimicrobial external treatment 71 to the wicking layer 3A. The mat 67 may also pass through an additional drying section 73 to apply additional drying before the layer 3A is rolled up, for example when the antimicrobial external treatment 71 is applied in liquid form.

Figure 8:
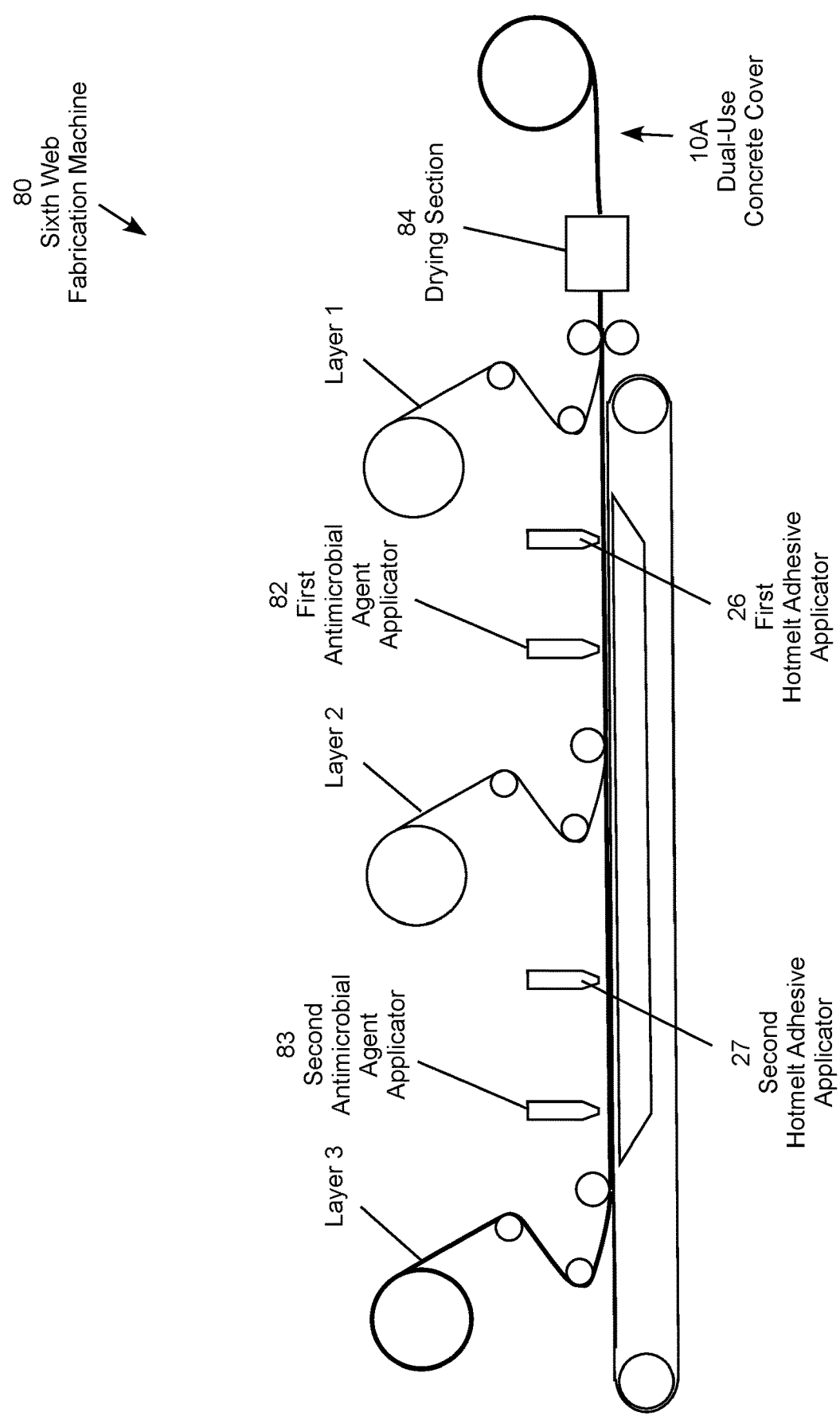
FIG. 8 is a conceptual process diagram of a sixth web fabrication machine.

Similarly, FIG. 8 is a conceptual process diagram of a sixth web fabrication machine 80 for fabricating an alternative dual-use concrete cover 10A. The machine 80 is similar to the first web fabrication machine 20 shown in FIG. 2, except that an additional or alternative first applicator 82 has been added to apply an antimicrobial agent to the vapor retardant layer 2 (i.e., between layers 1 and 2). In addition, an additional or alternative second applicator 83 has been added to apply an antimicrobial agent to the vapor retardant wicking layer 3 (i.e., between layers 2 and 3). The web may pass through an additional drying section 84 if the antimicrobial external treatments are applied in liquid form and additional drying is desired before rolling up the cover 10A.

Figure 9:
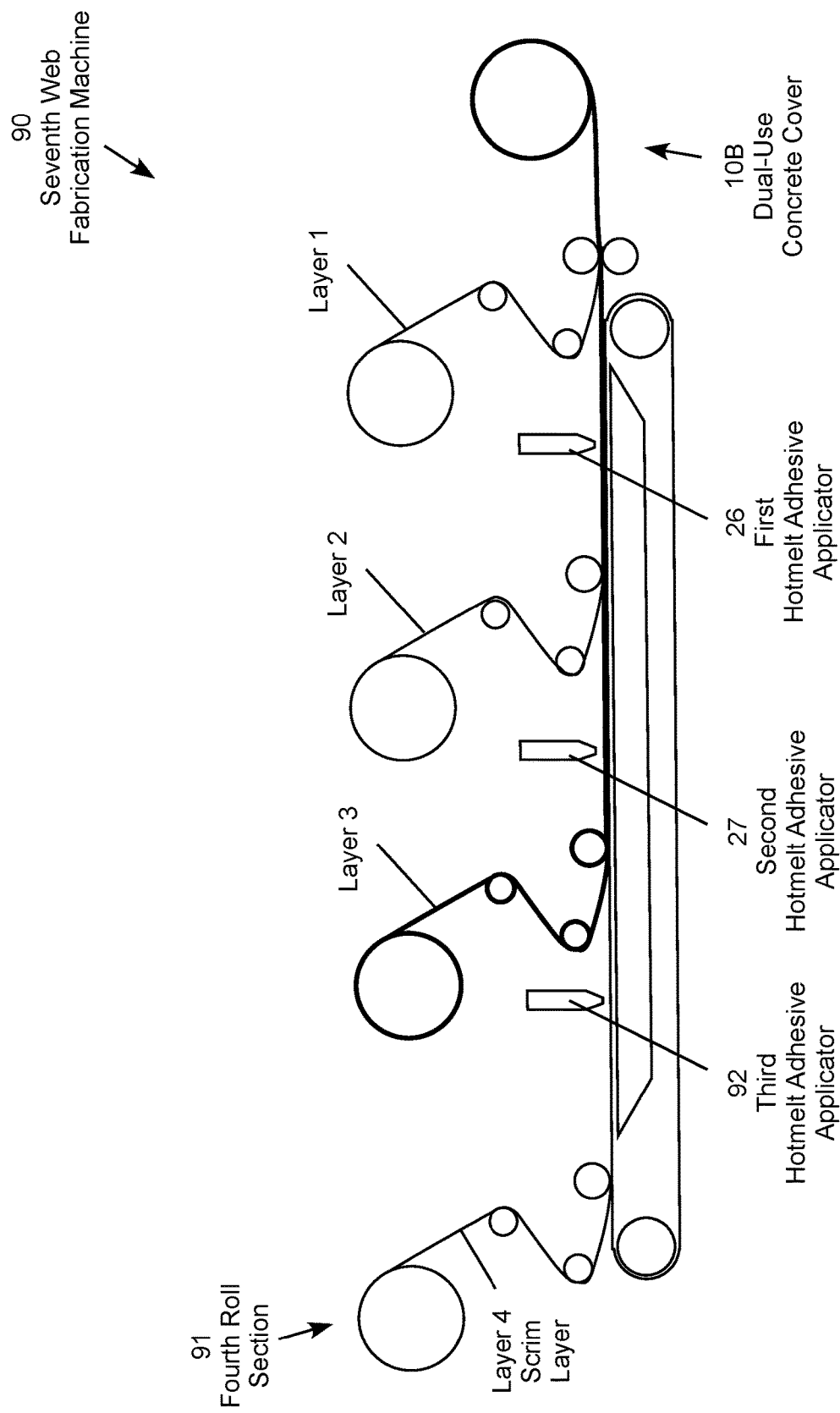
FIG. 9 is a conceptual process diagram of a seventh web fabrication machine.

FIG. 9 is a conceptual process diagram of a seventh web fabrication machine 90 for fabricating another alternative dual-use concrete cover 10B. The machine 90 is similar to the first web fabrication machine 20 shown in FIG. 2, except that an additional fourth roll section 91 has been added to add an anti-snag scrim layer 4 below the wicking layer 3. In addition, a third hotmelt adhesive applicator 92 has been added to apply adhesive between layer 3 and layer 4.

Figure 10:
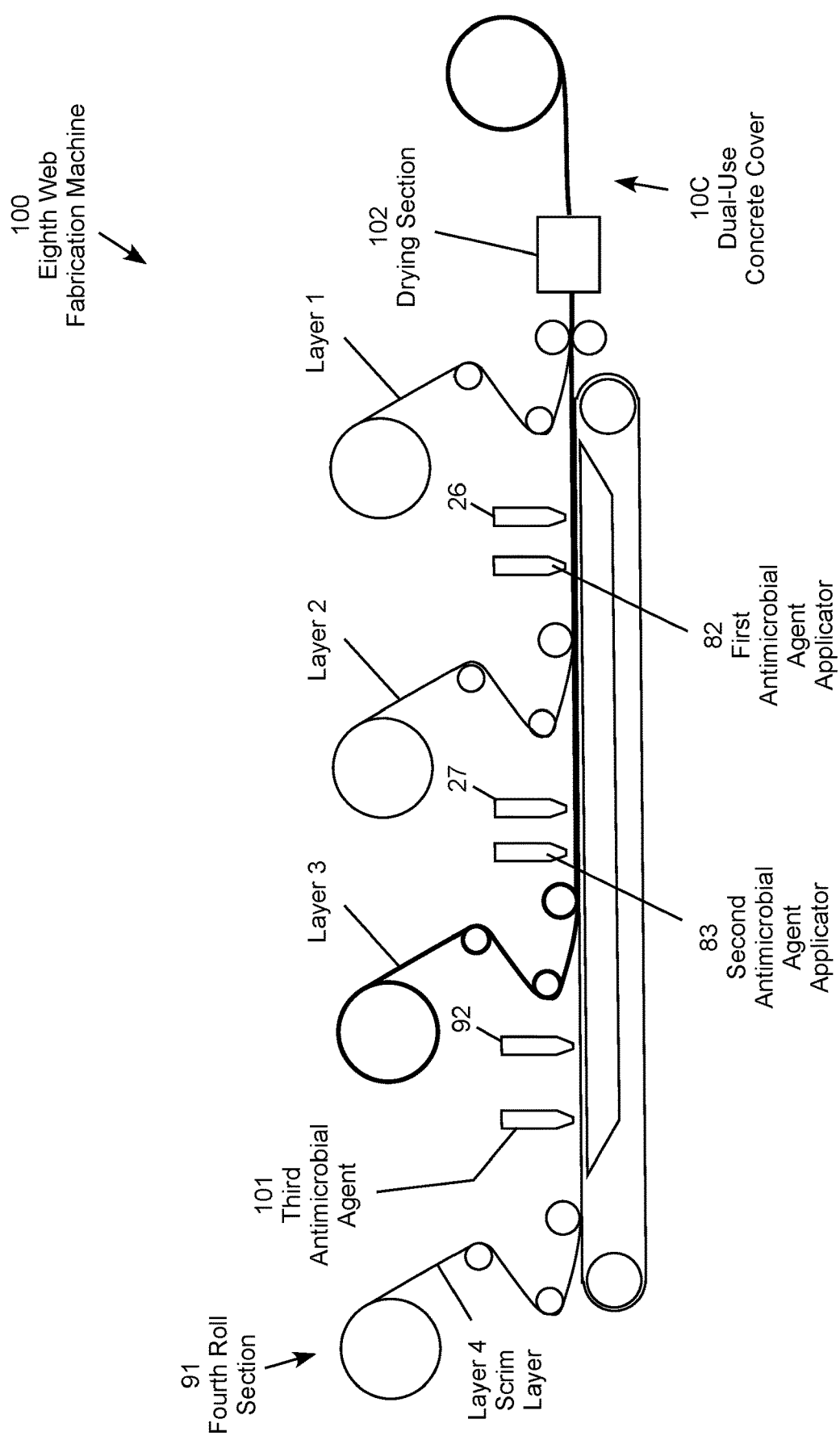
FIG. 10 is a conceptual process diagram of an eighth web fabrication machine.

FIG. 10 is a conceptual process diagram of an eighth web fabrication machine 100 for fabricating another alternative dual-use concrete cover 10C. The machine 100 is similar to the first web fabrication machine 90 shown in FIG. 9, except that an additional or alternative applicator 101 has been added to apply an antimicrobial agent to the scrim layer 4 (i.e., between layers 3 and 4). The web may pass through an additional drying section 102 if the antimicrobial agent is applied in liquid form and additional drying is required before rolling up the cover 10C. In various embodiments, one or more of the antimicrobial agent applications, hotmelt adhesive applicators, the drying section may be eliminated.

Figure 11:
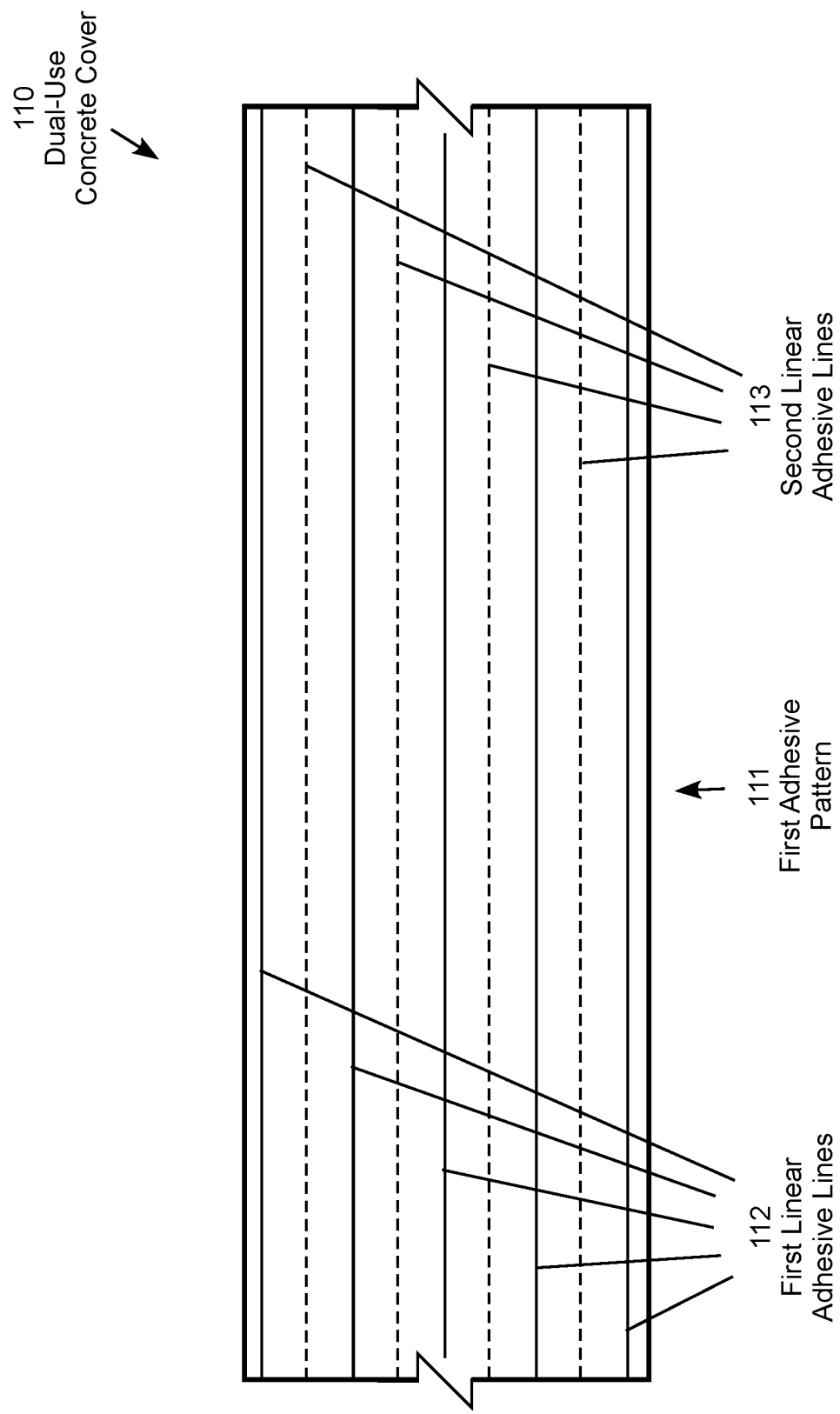
FIG. 11 is a conceptual top view of a first adhesive pattern for a dual-use concrete cover.
Figure 12:
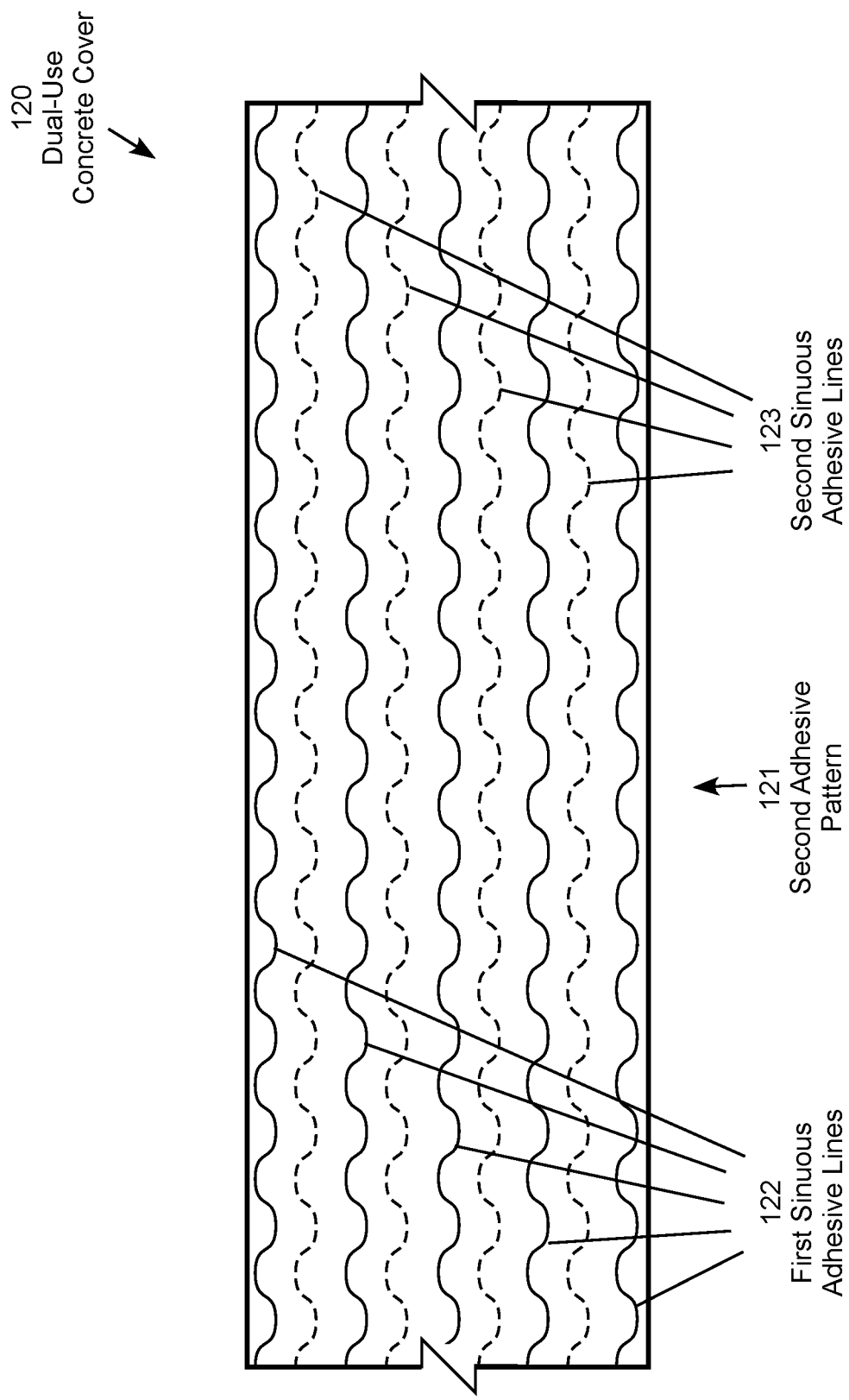
FIG. 12 is a conceptual top view of a second adhesive pattern for a dual-use concrete cover.

The hotmelt adhesive should be applied in thin lines or dots to minimize interference with vapor dissipation through the cover. In a specific representative example, FIG. 11 is a conceptual top view of a first adhesive pattern 110 including first linear adhesive lines 111 (shown in solid lines) between layers 1 and layer 2, which are offset from second linear adhesive lines 112 (shown in dashed lines) between layers 2 and layer 3. In this example, the adhesive lines 111 and 112 may be continuous, line segments or lines of dots in the longitudinal (machine) direction. FIG. 12 shows an example second adhesive pattern 120 including first sinuous adhesive lines 121 (shown in solid lines) between layers 1 and layer 2, which are offset from second sinuous adhesive lines 122 (shown in dashed lines) between layers 2 and layer 3. Again in this example, the adhesive lines 121 and 122 may be may be continuous, line segments or lines of dots in the longitudinal (machine) direction.

Figure 13:
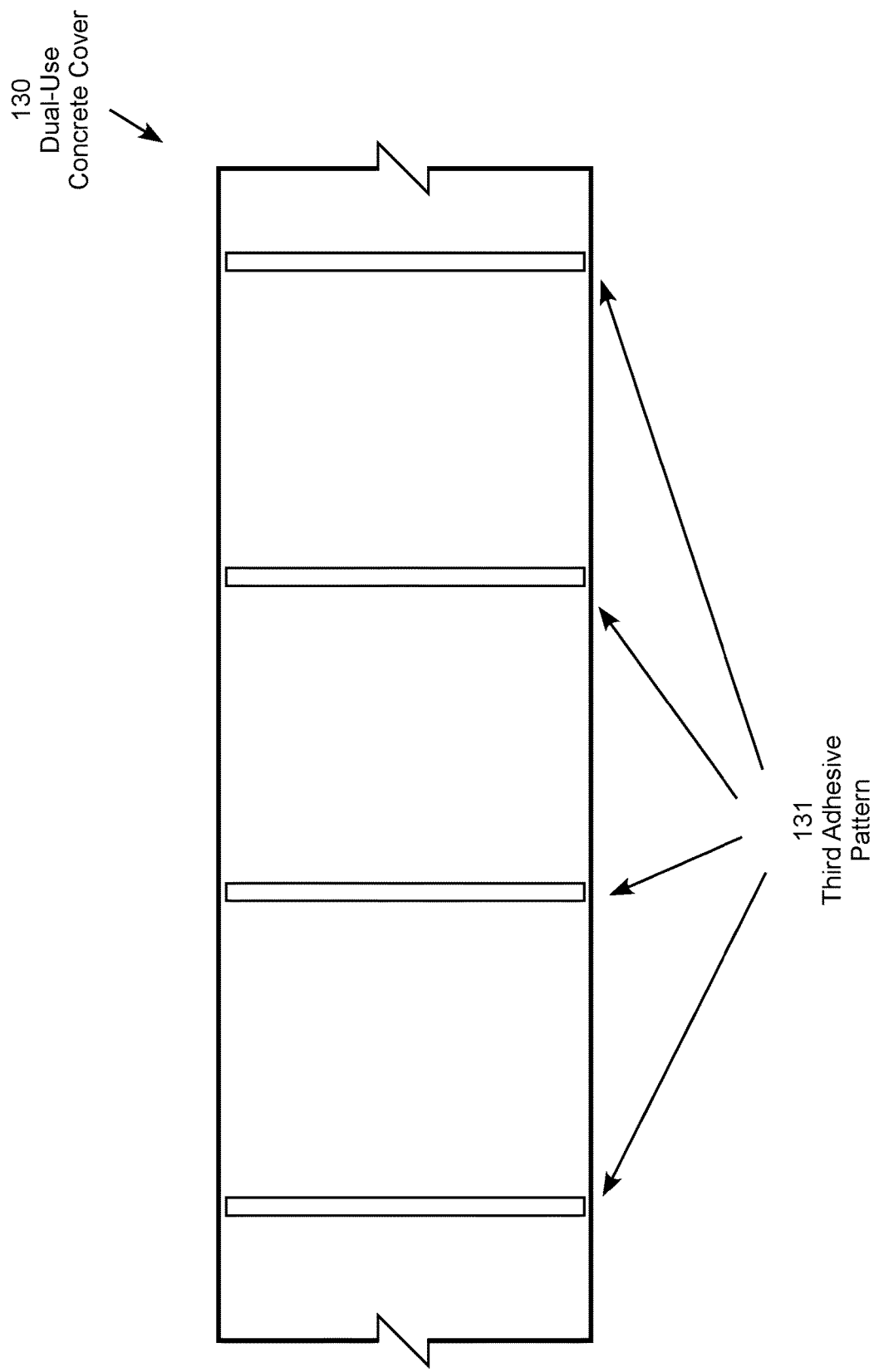
FIG. 13 is a conceptual top view of a third adhesive pattern for a dual-use concrete cover.

For embodiments that include a scrim layer 4, FIG. 13 shows a third adhesive pattern 130 with third adhesive lines 132 extending in the transverse (cross-machine) direction. FIG. 14 shows a variation, in which the transverse lines of adhesive are replaced with rows of dots 141. In general the adhesive lines shown in FIG. 11, FIG. 12 and FIG. 13 may be continuous, line segments, lines of dots, or another desired adhesive pattern.

FIG. 15A is a conceptual side view and FIG. 15B is a conceptual top view of a dual-use concrete cover 150 that includes a stiffener layer 151. In general, adhering the layers together stiffens the cover 10 to mitigate gathering, folding or puckering when wheeled devices, such as forklifts, air compressors, gurneys, medical equipment and the like are roiled over the cover, which could otherwise jam or trip the wheels or damage the cover. Adding a polyurethane coating to the vapor retardant layer 2 further stiffens the cover 10 for this purpose. The additional stiffener layer 151 may also be added to mitigate gathering, folding or puckering under wheeled devices. For example, high density polyethylene (HDPE), acrylonitrile butadiene Styrene (ABS), polycarbonate, and Nylon plastic strips or lattice are illustrative choices for plastic stiffeners. A representative stiffener layer includes a square lattice in the range of 4 to 10 inches with cross members in the range of 0.125 to 0.25 inches wide by 0.0625 to 0.125 inches thick. Locating the plastic stiffener lattice above the wicking layer 3 allows the stiffener lattice to settle into the airlaid mat with the PTFE layer 2 passing over the lattice to provide a smooth rolling surface on top of the cover 10 while resisting gathering, folding or puckering under wheeled devices without impeding rolling up the cover. This makes the cover 10 an effective surface for wheeled devices, while providing for much easier and faster "rolling out" and "rolling up" in comparison to tile or panel temporary flooring options.

Figure 16:
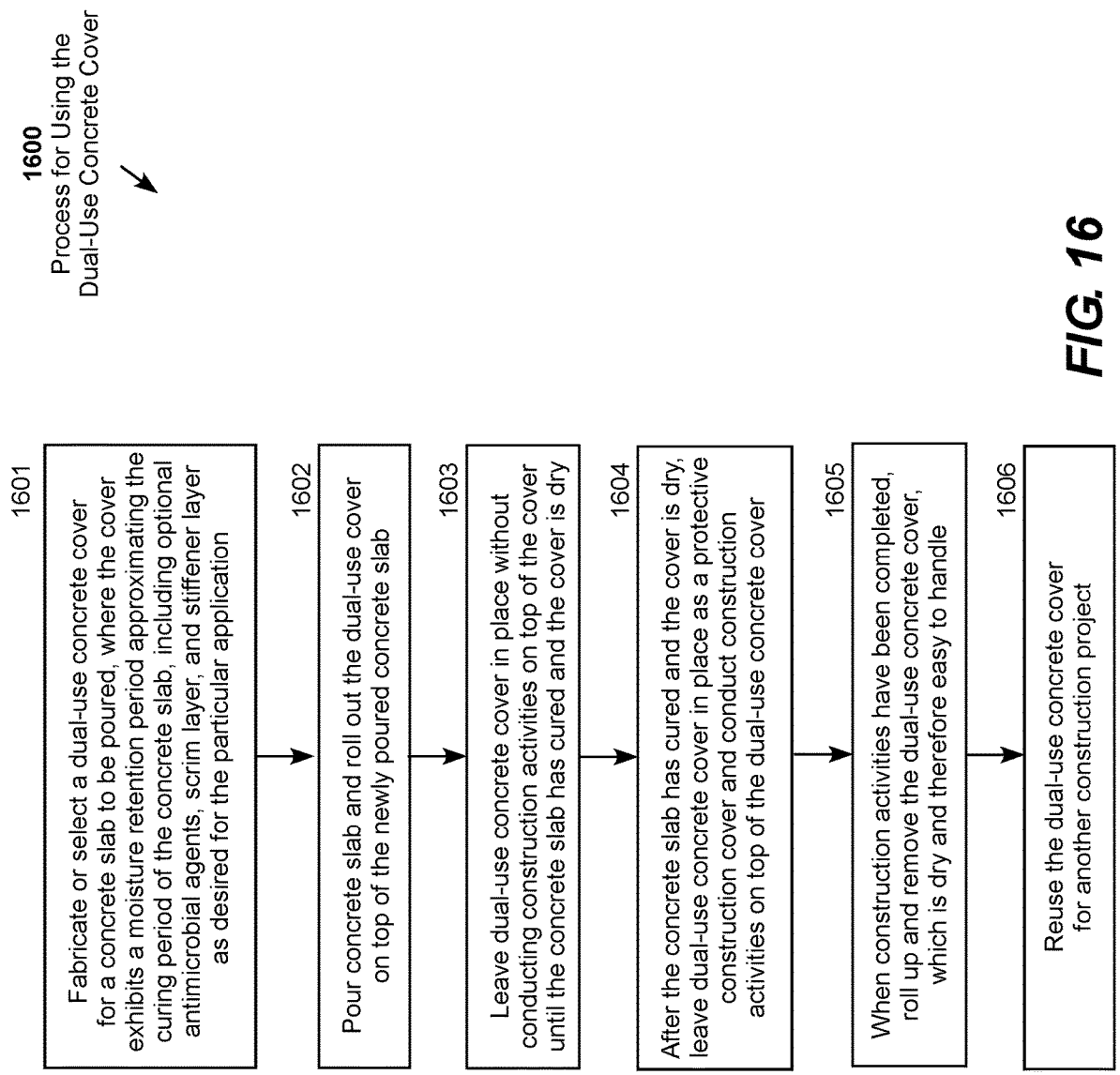
FIG. 16 is a flow chart illustrating a process for using the dual-use concrete cover as a concrete curing blanket and as a protective construction cover after the concrete slab has cured.

FIG. 16 is a flow chart illustrating a process 1600 for using the dual-use concrete cover as a concrete curing blanket and as a protective construction cover after the concrete slab has cured. In step 1601, the manufacturer fabricates or the user selects a dual-use concrete cover for a concrete slab to be poured. The cover is selected to approximate the concrete curing period in the environment in which the concrete slab will be curing. That is, the cover exhibits a moisture retention period approximating the curing period of the concrete slab in the environment in which the concrete slab will be curing. The cover may also include optional antimicrobial agents, scrim layer, and stiffener layer as desired for the particular application. Step 1601 is followed by step 1602, in which the user or an associated construction crew pours the concrete slab and rolls out the dual-use concrete cove on top of the newly poured slab. Step 1602 is followed by step 1603, in which the user leaves the dual-use concrete cover in place without conducting construction activities on top of the cover until the concrete slab has cured and the cover is dry. Step 1603 is followed by step 1604, in which, after the concrete slab has cured and the cover is dry, the user leaves the dual-use concrete cover in place as a protective construction cover and conducts construction activities on top of the dual-use concrete cover. Step 1604 is followed by step 1605, in which, when construction activities have been completed, the user rolls up and removes the dual-use concrete cover, which is dry and therefore easy to handle at that point. Step 1605 is followed by step 1604, in which the user reuses the dual-use concrete cover for another construction project, if desired.

It will be appreciated that the dual-use concrete cover described above is suitable for use in situations other than construction, such as a temporary roll-out cover for a wide range of applications. The temporary roll-out cover is particularly useful in a medical or other sanitary location where the antimicrobial feature is highly valued. For example, an antimicrobial roll-out cover is well suited to temporary "pop-up" medical facilities, temporary military medical facilities, hospitals, clinics, offices, schools, athletic surfaces, and the like. The stiffener layer may be a desirable option for these applications to prevent the cover from folding, gathering or puckering, which might otherwise interfere with the movement of wheeled devices, such as gurneys, medical equipment, sporting equipment, rolling desks, rolling office dividers, and the like. As another example, the easy roll-up and reusable features may be particularly desirable for other flooring and ground cover situations, such as temporary automobile repair jobs, painting jobs, building resurfacing jobs, group exercise mats, art fabrication, party locations, and so forth.

It will be further appreciated that certain features and options may be desirable or more important of some applications versus others. For some applications where retarding the rate of vapor dissipation is not important, such as most uses that do not involve concrete curing, the vapor retardant second layer may be omitted. The vapor retardant second layer may also be omitted when cost and reusability are important factors, but preventing folding is not important, such as an inexpensive paint drop cloth intended for use in a medical or other sterile environment. For applications where facilitating rolling devices on top of the cover and reusability are important attributes, the stiffener lattice and a PTFE seconds layer may be selected, not as a vapor retardant but rather to improve the smoothness of the top of the cover as a rolling surface for wheeled devices. For other applications where facilitating rolling devices on top of the cover is not important, or where preventing folding is not important, the stiffener lattice may be omitted. For other applications where the antimicrobial feature is extremely important, multiple antimicrobial agents may be formed into the airlaid mat and sprayed between layers. Many other feature sets, options and applications will become apparent to those skilled in the art based upon the teachings of the invention.

Although the dual-use concrete covers have been illustrated in the context of horizontal pavement construction, it will be appreciated that they well adapted for, but not limited to, concrete floor and road construction. It should be appreciated that they can be used as concrete curing blankets and construction covers for other types of structures, such as bridge supports, sidewalks, pedestrian areas, arenas, and so forth. The roll-out temporary covers may also for any type of floor and, more particularly, as temporary, roll-out covers for many different types of floors and ground covers. Those skilled in the art will appreciate that the foregoing describes preferred embodiments of the invention and that many adjustments and alterations will be apparent to those skilled in the art within the spirit and scope of the invention as defined by the appended claims.

The invention claimed is:

1. A dual-use concrete cover for a newly poured concrete slab, comprising:
   a construction cover layer that is waterproof, exhibits a weight of at least 6 ounces per square yard, exhibits a first water vapor permeability, and selected to protect the concrete slab during a construction period following a concrete curing period;
   a concrete curing blanket adhered to the construction cover comprising a vapor retardant layer comprising expanded PTFE that exhibits a second water vapor permeability and a wicking layer comprising an airlaid mat comprising cellulose fluff pulp and binder fibers that is water absorbent and exhibits a third water vapor permeability;
   wherein the vapor retardant layer is positioned between the construction cover layer and the wicking layer;
   wherein the second water vapor permeability is less than the first and third water vapor permeabilities and selected to cause the construction cover to exhibit a desired overall water vapor permeability, when placed against the newly poured concrete slab, that causes the wicking layer to remain wet during a moisture retention period approximating a concrete curing period of the newly poured concrete slab, and then become dry and separate from the newly poured concrete slab after the moisture retention period.

2. The dual-use concrete cover of claim 1, wherein the moisture retention period is in the range of 14 to 28 days.

3. The dual-use concrete cover of claim 1, wherein the wicking layer comprises an antimicrobial agent.

4. The dual-use concrete cover of claim 1, wherein the construction cover layer comprising woven polypropylene exhibiting a weight in the range of 6 to 10 ounces per square yard.

5. The dual-use concrete cover of claim 1, wherein the vapor retardant layer comprises expanded PTFE exhibiting a weight in the range of 0.5 to 1.5 ounces per square yard.

6. The dual-use concrete cover of claim 5, wherein the vapor retardant layer further comprises a coating comprising polyurethane coating.

7. The dual-use concrete cover of claim 6, wherein the vapor retardant layer further comprises perforations through the coating.

8. The dual-use concrete cover of claim 1, wherein the wicking layer comprises an airlaid mat comprising cellulose fluff pulp and binder fibers in the range of 4.0 to 7.5 ounces per square yard.

9. The dual-use concrete cover of claim 1, further comprising a scrim layer next to the wicking layer comprising woven or nonwoven cotton, fiberglass, polyester or blend exhibiting a weight in the range of 0.5 to 3.0 ounces per square yard.

10. The dual-use concrete cover of claim 1, further comprising a stiffener lattice positioned between the vapor retardant layer and the wicking layer.

11. A dual-use concrete cover, comprising:
    a construction cover layer comprising woven polypropylene exhibiting a weight in the range of 6 to 10 ounces per square yard;
    a concrete curing blanket adhered to the construction cover comprising a vapor retardant layer comprising expanded PTFE exhibiting a weight in the range of 0.5 to 1.5 ounces per square yard and a wicking layer comprising an airlaid mat comprising cellulose fluff pulp and binder fibers exhibiting a weight in the range of 4.0 to 7.5 ounces per square yard.

12. The dual-use concrete cover of claim 11, wherein the vapor retardant second further comprises a coating comprising polyurethane.

13. The dual-use concrete cover of claim 12, wherein the vapor retardant second further comprises perforations through the coating.

14. The dual-use concrete cover of claim 11, wherein the wicking layer further comprises an antimicrobial agent.

15. The dual-use concrete cover of claim 11, further comprising a scrim layer next to the wicking layer comprising woven or nonwoven cotton, fiberglass, polyester or blend scrim material exhibiting a weight in the range of 0.5 to 3.0 ounces per square yard.

16. The dual-use concrete cover of claim 11, further comprising a stiffener lattice positioned between the vapor retardant layer and the wicking layer.

* * * * *